United States Patent
Ono

(10) Patent No.: US 11,917,276 B2
(45) Date of Patent: *Feb. 27, 2024

(54) IMAGING DEVICE AND IMAGING METHOD

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 17/322,921

(22) Filed: May 18, 2021

(65) Prior Publication Data

US 2021/0274070 A1 Sep. 2, 2021

Related U.S. Application Data

(63) Continuation of application No. PCT/JP2019/042860, filed on Oct. 31, 2019.

(30) Foreign Application Priority Data

Nov. 26, 2018 (JP) ................................. 2018-220490

(51) Int. Cl.
*H04N 23/55* (2023.01)
*G02B 5/20* (2006.01)
*G02B 5/30* (2006.01)

(52) U.S. Cl.
CPC ............... *H04N 23/55* (2023.01); *G02B 5/20* (2013.01); *G02B 5/3025* (2013.01)

(58) Field of Classification Search
CPC ........ H04N 25/62; H04N 25/70; H04N 23/12; H04N 23/55; G02B 27/28; G02B 27/286;
(Continued)

(56) References Cited

U.S. PATENT DOCUMENTS 9,661,193 B2 * 5/2017 Narumi .................. H04N 5/211
2009/0179143 A1 7/2009 Murooka et al.
(Continued)

FOREIGN PATENT DOCUMENTS

JP 2009162847 7/2009
JP 2009169096 7/2009
(Continued)

OTHER PUBLICATIONS

"International Search Report (Form PCT/ISA/210) of PCT/JP2019/042860," dated Jan. 28, 2020, with English translation thereof, pp. 1-5.
(Continued)

*Primary Examiner* — Kelly L Jerabek
(74) *Attorney, Agent, or Firm* — JCIPRNET

(57) ABSTRACT

Provided are an imaging device and an imaging method that can generate images between which a difference in appearance caused by a difference between the polarization directions of received light is suppressed in a case in which different images are generated on the basis of light having different polarization directions. An imaging device (1) includes: an imaging optical system (10); a first polarizer that aligns a polarization direction of light transmitted through a first pupil region and a second pupil region with a first polarization direction; a second polarizer that transmits light in a second polarization direction different from the first polarization direction; an imaging element (100) that receives the light transmitted through the first pupil region and the second pupil region; and an image generation unit that performing a crosstalk removal process on pixel signals of a first pixel and a second pixel and generates a first image corresponding to the light transmitted through the first pupil region and a second image corresponding to the light
(Continued)

transmitted through the second pupil region on the basis of the pixel signals subjected to the crosstalk removal process.

16 Claims, 16 Drawing Sheets

(58) Field of Classification Search
CPC ........ G02B 3/0056; G02B 5/201; G02B 5/20; G02B 5/30; G02B 5/3025; G01J 3/0224; G01J 3/2803; H01L 27/14625; H01L 27/14627
See application file for complete search history.

(56) References Cited

U.S. PATENT DOCUMENTS

| | | | | |
|---|---|---|---|---|
| 2012/0249752 | A1* | 10/2012 | Baba ................. | H04N 13/218 |
| | | | | 348/E13.074 |
| 2013/0083172 | A1 | 4/2013 | Baba | |
| 2015/0192758 | A1* | 7/2015 | Yamagata ............. | H04N 25/62 |
| | | | | 348/360 |
| 2015/0381871 | A1* | 12/2015 | Makino ............... | H04N 23/951 |
| | | | | 348/335 |
| 2016/0065938 | A1* | 3/2016 | Kazemzadeh ......... | H04N 23/11 |
| | | | | 348/46 |
| 2019/0260974 | A1 | 8/2019 | Kaizu et al. | |
| 2021/0306584 | A1* | 9/2021 | Moriyama .......... | G02B 5/3058 |

FOREIGN PATENT DOCUMENTS

| | | |
|---|---|---|
| JP | 2013077935 | 4/2013 |
| JP | 2013197770 | 9/2013 |
| WO | 2018074064 | 4/2018 |

OTHER PUBLICATIONS

"Written Opinion of the International Searching Authority (Form PCT/ISA/237) of PCT/JP2019/042860," dated Jan. 28, 2020, with English translation thereof, pp. 1-10.

"International Search Report (Form PCT/ISA/210) of PCT/JP2019/042860," dated Oct. 31, 2019, with English translation thereof, pp. 1-5.

"Written Opinion of the International Searching Authority (Form PCT/ISA/237) of PCT/JP2019/042860," dated Oct. 31, 2019, with English translation thereof, pp. 1-10.

"International Search Report (Form PCT/ISA/210) of PCT/JP2019/042860," dated Jan. 1, 2019, with English translation thereof, pp. 1-5.

"Written Opinion of the International Searching Authority (Form PCT/ISA/237) of PCT/JP2019/042860," dated Jan. 1, 2019, with English translation thereof, pp. 1-10.

"Notice of Allowance of Co-pending U.S. Appl. No. 17/322,923", dated Sep. 14, 2023, pp. 1-17.

"International Search Report (Form PCT/ISA/210) of PCT/JP2019/042861," dated Jan. 28, 2020, with English translation thereof, pp. 1-5.

"Written Opinion of the International Searching Authority (Form PCT/ISA/237) of PCT/JP2019/042861," dated Jan. 28, 2020, with English translation thereof, pp. 1-11.

* cited by examiner

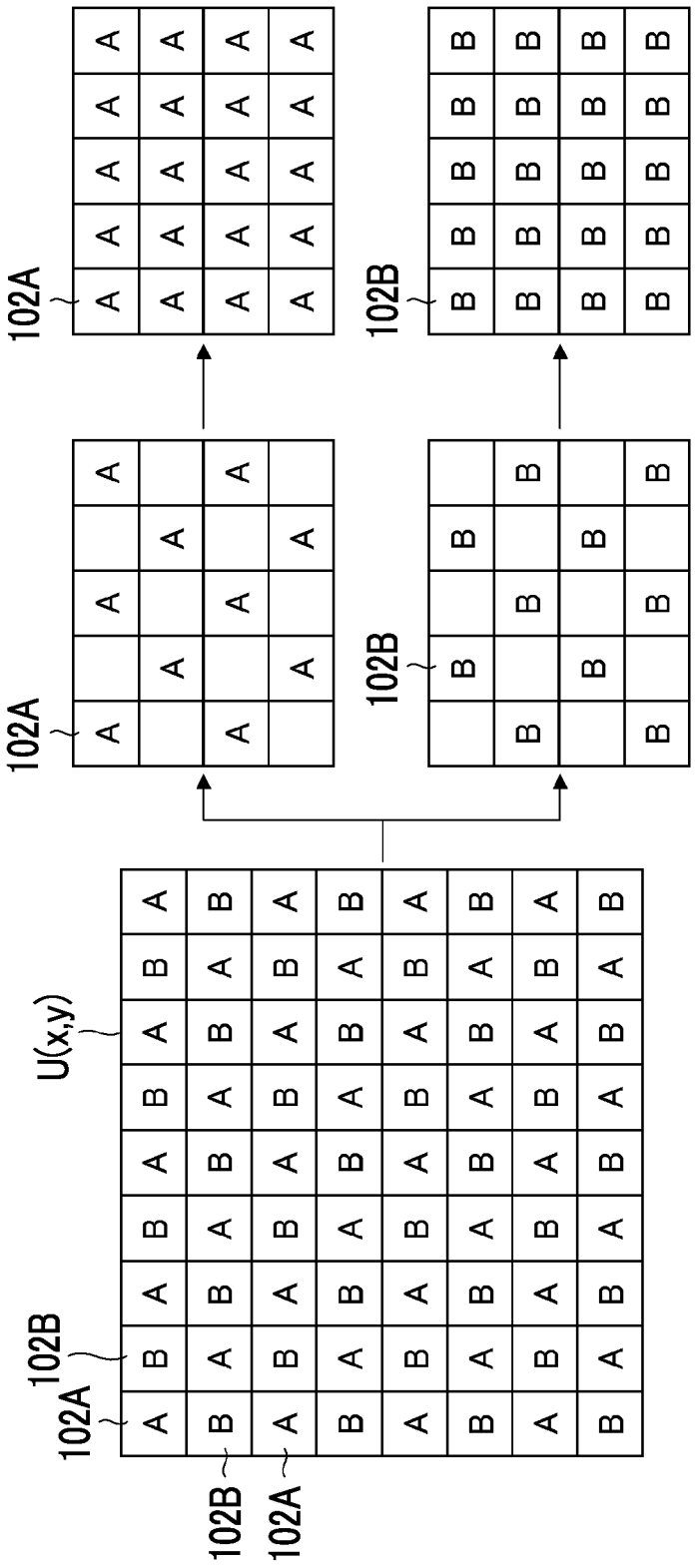

IMAGING DEVICE AND IMAGING METHOD

CROSS-REFERENCE TO RELATED APPLICATIONS

The present application is a Continuation of PCT International Application No. PCT/JP2019/042860 filed on Oct. 31, 2019 claiming priority under 35 U.S.C § 119(a) to Japanese Patent Application No. 2018-220490 filed on Nov. 26, 2018. Each of the above applications is hereby expressly incorporated by reference, in its entirety, into the present application.

BACKGROUND OF THE INVENTION

1. Field of the Invention

The present invention relates to an imaging device and an imaging method, and more particularly, to an imaging device and an imaging method that independently acquire a plurality of images with one imaging element.

2. Description of the Related Art

In the related art, a technique has been proposed in which light in two different polarization directions is acquired by different pixels to acquire two independent images.

For example, JP2009-169096A discloses a technique in which light in two different polarization directions is received by different pixels to acquire two independent images. A light receiving element described in JP2009-169096A comprises an analyzer array that transmits light transmitted through a polarizer of a polarizing plate, and each image corresponding to light in different polarization directions received by the light receiving element is generated.

SUMMARY OF THE INVENTION

Here, in the technique described in JP2009-169096A, the images corresponding to the light in different polarization directions are generated. However, two types of light in different polarization directions are generated without aligning the polarization directions even once. Specifically, in JP2009-169096A, first, light transmitted through a lens is transmitted through a polarizing plate that transmits light having two types of polarization directions to generate two types of light having different polarization directions. Then, the two types of light having different polarization directions are transmitted through an analyzer and are received by the light receiving element. Therefore, in the imaging device described in JP2009-169096A, two types of light having different polarization directions are generated without aligning the polarization directions even once, and each image is generated on the basis of the light.

As such, in a case in which images are generated on the basis of light having different polarization directions without aligning the polarization directions even once, the following problems may occur.

For example, a technique is known which captures an image of a water surface at the Brewster's angle using a polarization filter to shield s-polarized light. However, in a case in which light having different polarization directions is generated from the beginning, one polarization direction can be aligned with a direction in which the s-polarized light is shielded, but it is difficult to align the other polarization direction with the direction in which the s-polarized light is shielded.

In addition, a technique is known which estimates the sugar content of fruits using spectral reflectance. However, in a case in which images based on light having different polarization directions are used without aligning the polarization directions even once, the spectral reflectance may not be calculated properly. Specifically, in the images based on the light having different polarization directions which have been obtained without aligning the polarization directions even once, for a high glossy portion of the object, the number of specular reflected light components is large, and the correct spectral reflectance is not obtained.

The invention has been made in view of the above-mentioned problems, and an object of the invention is to provide an imaging device and an imaging method that can generate images between which a difference in appearance caused by a difference between the polarization directions of received light is suppressed in a case in which different images are generated on the basis of light having different polarization directions.

According to an aspect of the invention, there is provided an imaging device comprising: an imaging optical system that has a pupil region including a first pupil region and a second pupil region different from the first pupil region; a first polarizer that aligns a polarization direction of light transmitted through the first pupil region and the second pupil region with a first polarization direction; a second polarizer that transmits light in a second polarization direction different from the first polarization direction in the light which has been transmitted through the second pupil region and has been aligned in the first polarization direction; an imaging element that receives the light transmitted through the first pupil region and the second pupil region and has a plurality of pixel units each of which is a set of a first pixel and a second pixel receiving light in different polarization directions; and an image generation unit that performs a crosstalk removal process on pixel signals of the first pixel and the second pixel and generates a first image corresponding to the light transmitted through the first pupil region and a second image corresponding to the light transmitted through the second pupil region on the basis of the pixel signals subjected to the crosstalk removal process.

According to this aspect, the first polarizer aligns the polarization direction of the light transmitted through the first pupil region and the second pupil region with the first polarization direction, and the second polarizer transmits the light in the second polarization direction different from the first polarization direction in the light which has been transmitted through the second pupil region and has been aligned with the first polarization direction. Therefore, according to this aspect, even in a case in which different images are generated on the basis of light having different polarization directions, it is possible to generate the images between which the difference in appearance caused by the difference between the polarization directions of the received light is suppressed.

Preferably, the imaging device further comprises a third polarizer that transmits light in a third polarization direction different from the first polarization direction and the second polarization direction in the light which has been transmitted through the first pupil region and has been aligned in the first polarization direction.

According to another aspect of the invention, there is provided an imaging device comprising: an imaging optical system that has a pupil region including a first pupil region and a second pupil region different from the first pupil region; a first polarizer that aligns a polarization direction of light transmitted through the first pupil region and the second pupil region with a first polarization direction; a second polarizer that transmits light in a second polarization direction different from the first polarization direction in the light which has been transmitted through the second pupil region and has been aligned in the first polarization direction; a third polarizer that transmits light in a third polarization direction, which is different from the first polarization direction and is orthogonal to the second polarization direction, in the light which has been transmitted through the first pupil region and has been aligned in the first polarization direction; an imaging element that receives the light transmitted through the first pupil region and the second pupil region and has a plurality of pixel units each of which is a set of a first pixel receiving the light in the second polarization direction and a second pixel receiving the light in the third polarization direction; and an image generation unit that generates a first image corresponding to the light transmitted through the first pupil region and a second image corresponding to the light transmitted through the second pupil region on the basis of pixel signals of the first pixel and the second pixel.

According to this aspect, the first polarizer aligns the polarization direction of the light transmitted through the first pupil region and the second pupil region with the first polarization direction, and the second polarizer transmits the light in the second polarization direction different from the first polarization direction in the light which has been transmitted through the second pupil region and has been aligned with the first polarization direction. Therefore, according to this aspect, even in a case in which different images are generated on the basis of light having different polarization directions, it is possible to generate the images between which the difference in appearance caused by the difference between the polarization directions of the received light is suppressed. Further, in this aspect, the second polarization direction and the third polarization direction are orthogonal to each other, and the first pixel receiving the light in the second polarization direction and the second pixel receiving the light in the third polarization direction are provided. Therefore, ideally, it is not necessary to perform the crosstalk removal process without mixing signals corresponding to the light in the second polarization direction and the light in the third polarization direction. Therefore, according to this aspect, it is possible to obtain appropriate first and second images without performing the crosstalk removal process.

Preferably, the imaging device further comprises: a first wavelength filter that transmits light in a first wavelength band in the light transmitted through the first pupil region; and a second wavelength filter that transmits light in a second wavelength band in the light transmitted through the second pupil region.

According to still another aspect of the invention, there is provided an imaging device comprising: an imaging optical system that has a pupil region including a first pupil region, a second pupil region different from the first pupil region, and a third pupil region different from the first pupil region and the second pupil region; a first polarizer that aligns a polarization direction of light transmitted through the first pupil region, the second pupil region, and the third pupil region with a first polarization direction; a second polarizer that transmits light in a second polarization direction different from the first polarization direction in the light which has been transmitted through the second pupil region and has been aligned in the first polarization direction; a third polarizer that transmits light in a third polarization direction different from the first polarization direction and the second polarization direction in the light which has been transmitted through the third pupil region and has been aligned in the first polarization direction; an imaging element that receives the light transmitted through the first pupil region, the second pupil region, and the third pupil region and has a plurality of pixel units each of which is a set of a first pixel, a second pixel, and a third pixel receiving light in different polarization directions; and an image generation unit that performs a crosstalk removal process on pixel signals of the first pixel, the second pixel, and the third pixel and generates a first image corresponding to the light transmitted through the first pupil region, a second image corresponding to the light transmitted through the second pupil region, and a third image corresponding to the light transmitted through the third pupil region on the basis of the pixel signals subjected to the crosstalk removal process.

According to this aspect, the first polarizer aligns the polarization direction of the light transmitted through the first pupil region, the second pupil region, and the third pupil region with the first polarization direction. The second polarizer transmits the light in the second polarization direction different from the first polarization direction in the light which has been transmitted through the second pupil region and has been aligned in the first polarization direction. The third polarizer transmits the light in the third polarization direction different from the first polarization direction and the second polarization direction in the light which has been transmitted through the third pupil region and has been aligned in the first polarization direction. Therefore, according to this aspect, even in a case in which different images are generated on the basis of light having different polarization directions, it is possible to generate the images between which the difference in appearance caused by the difference between the polarization directions of the received light is suppressed.

Preferably, the imaging device further comprises a fourth polarizer that transmits light in a fourth polarization direction different from the first polarization direction, the second polarization direction, and the third polarization direction in the light which has been transmitted through the first pupil region and has been aligned in the first polarization direction.

Preferably, the imaging device further comprises: a first wavelength filter that transmits light in a first wavelength band in the light transmitted through the first pupil region; a second wavelength filter that transmits light in a second wavelength band in the light transmitted through the second pupil region; and a third wavelength filter that transmits light in a third wavelength band in the light transmitted through the third pupil region.

Preferably, the first polarizer shields s-polarized light.

Preferably, in the imaging element, the pixel unit includes a pixel including a polarization element.

Preferably, in the imaging element, the polarization element is provided between a photodiode and a microlens which constitute the pixel.

According to yet another aspect of the invention, there is provided an imaging method comprising: a step of causing a first polarizer to align a polarization direction of light transmitted through a first pupil region and a second pupil region of an imaging optical system, which has a pupil region including the first pupil region and the second pupil region different from the first pupil region, with a first polarization direction; a step of causing a second polarizer to transmit light in a second polarization direction different from the first polarization direction in the light which has been transmitted through the second pupil region and has been aligned in the first polarization direction; and a step of performing a crosstalk removal process on pixel signals of a first pixel and a second pixel of an imaging element, which receives the light transmitted through the first pupil region and the second pupil region and has a plurality of pixel units each of which is a set of the first pixel and the second pixel receiving light in different polarization directions, and generating a first image corresponding to the light transmitted through the first pupil region and a second image corresponding to the light transmitted through the second pupil region on the basis of the pixel signals subjected to the crosstalk removal process.

According to yet still another aspect of the invention, there is provided an imaging method comprising: a step of causing a first polarizer to align a polarization direction of light transmitted through a first pupil region and a second pupil region of an imaging optical system, which has a pupil region including the first pupil region and the second pupil region different from the first pupil region, with a first polarization direction; a step of causing a second polarizer to transmit light in a second polarization direction different from the first polarization direction in the light which has been transmitted through the second pupil region and has been aligned in the first polarization direction; a step of causing a third polarizer to transmit light in a third polarization direction, which is different from the first polarization direction and is orthogonal to the second polarization direction, in the light which has been transmitted through the first pupil region and has been aligned in the first polarization direction; and a step of generating a first image corresponding to the light transmitted through the first pupil region and a second image corresponding to the light transmitted through the second pupil region on the basis of pixel signals of a first pixel and a second pixel of an imaging element which receives the light transmitted through the first pupil region and the second pupil region and has a plurality of pixel units each of which is a set of the first pixel receiving the light in the second polarization direction and the second pixel receiving the light in the third polarization direction.

According to still yet another aspect of the invention, there is provided an imaging method comprising: a step of causing a first polarizer to align a polarization direction of light transmitted through a first pupil region, a second pupil region, and a third pupil region of an imaging optical system, which has a pupil region including the first pupil region, the second pupil region different from the first pupil region, and the third pupil region different from the first pupil region and the second pupil region, with a first polarization direction; a step of causing a second polarizer to transmit light in a second polarization direction different from the first polarization direction in the light which has been transmitted through the second pupil region and has been aligned in the first polarization direction; a step of causing a third polarizer to transmit light in a third polarization direction different from the first polarization direction and the second polarization direction in the light which has been transmitted through the third pupil region and has been aligned in the first polarization direction; and a step of performing a crosstalk removal process on pixel signals of a first pixel, a second pixel, and a third pixel of an imaging element, which receives the light transmitted through the first pupil region, the second pupil region, and the third pupil region and has a plurality of pixel units each of which is a set of the first pixel, the second pixel, and the third pixel receiving light in different polarization directions, and generating a first image corresponding to the light transmitted through the first pupil region, a second image corresponding to the light transmitted through the second pupil region, and a third image corresponding to the light transmitted through the third pupil region on the basis of the pixel signals subjected to the crosstalk removal process.

According to the invention, polarization is aligned once. Therefore, it is possible to generate the images between which the difference in appearance caused by the difference between the polarization directions of the received light is suppressed even in a case in which different images are generated on the basis of light having different polarization directions.

BRIEF DESCRIPTION OF THE DRAWINGS

FIG. 11 is a conceptual diagram illustrating image generation.

DESCRIPTION OF THE PREFERRED EMBODIMENTS

Hereinafter, preferred embodiments of the invention will be described in detail with reference to the accompanying drawings.

First Embodiment

Figure 1:
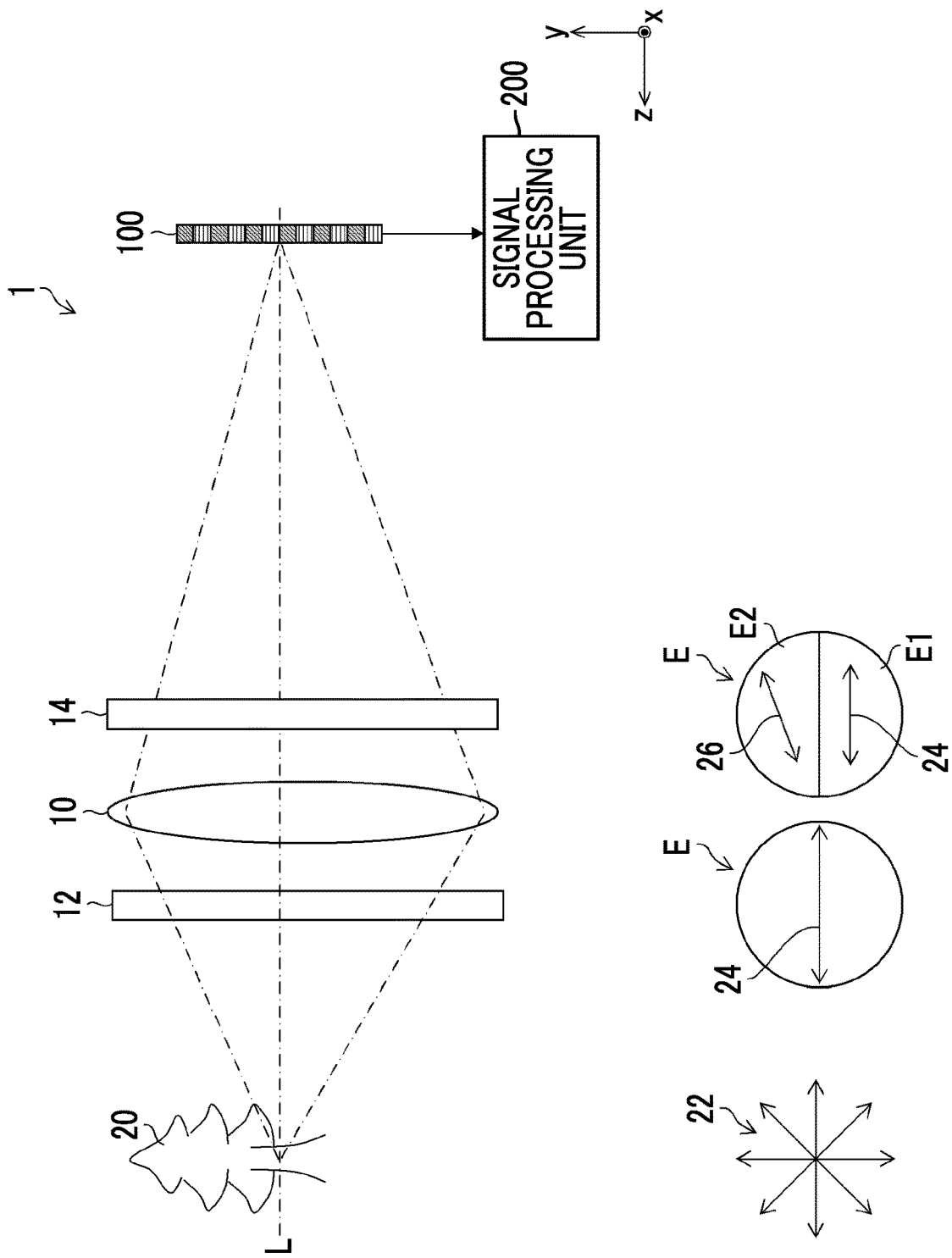
FIG. 1 is a diagram illustrating a schematic configuration of an imaging device.

FIG. 1 is a diagram illustrating a schematic configuration of an imaging device 1 according to a first embodiment. In this embodiment, two independent images are acquired by using two different polarization directions (a first polarization direction 24 and a second polarization direction 26).

As illustrated in FIG. 1, the imaging device 1 according to this embodiment comprises an imaging optical system 10, a first polarization filter (first polarizer) 12, a second polarization filter (second polarizer) 14, an imaging element 100, and a signal processing unit 200. Further, in FIG. 1, a polarization direction 22 of natural light reflected by an object 20, the first polarization direction 24 which is the polarization direction of light transmitted through the first polarization filter 12, and the second polarization direction 26 which is the polarization direction of light transmitted through the second polarization filter 14 are illustrated below the first polarization filter 12 and the second polarization filter 14 together with a pupil region E of the imaging optical system 10.

Light reflected by the object 20 includes all of the polarization directions 22. This light is captured by the imaging optical system 10. The pupil region E of the imaging optical system 10 includes a first pupil region E1 and a second pupil region E2. The first pupil region E1 and the second pupil region E2 can be determined in any manner. For example, as illustrated in FIG. 1, the pupil region E may be divided into two regions in the vertical direction. One of the two regions may be the first pupil region E1 and the other of the two regions may be the second pupil region E2. In this case, a parallax image can be obtained from an image based on light transmitted through the first pupil region E1 and an image based on light transmitted through the second pupil region E2. Further, for example, the pupil region E may be divided into two regions in the horizontal direction orthogonal to the vertical direction. One of the two regions may be the first pupil region E1 and the other of the two regions may be the second pupil region E2.

The light transmitted through the first pupil region E1 and the second pupil region E2 is incident on the first polarization filter 12 which is provided at a pupil position or near the pupil position and is transmitted through the first polarization filter 12. The polarization direction of the light transmitted through the first pupil region E1 and the second pupil region E2 is aligned with the first polarization direction 24 by the first polarization filter 12. Then, the second polarization filter 14 provided in a half pupil region (the first pupil region E1 or the second pupil region E2) which is the half of the pupil region E transmits light in the second polarization direction 26. Then, the imaging element 100 receives the light in the first polarization direction 24 and the light in the second polarization direction 26.

[Polarizer]

Figure 2:
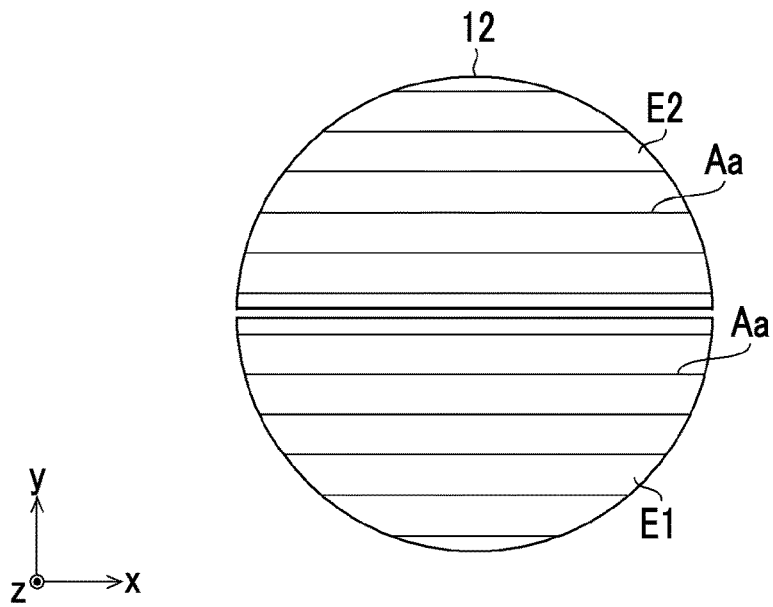
FIG. 2 is a front view illustrating a schematic configuration of a first polarization filter.

FIG. 2 is a front view illustrating a schematic configuration of the first polarization filter (first polarizer) 12. As illustrated in FIG. 1, the first polarization filter 12 is provided at or near the pupil position of the imaging optical system 10. Then, the first polarization filter 12 has a polarization transmission axis (Aa) in the same direction on the entire surface and aligns the polarization direction of the light transmitted through the first pupil region E1 and the second pupil region E2 with the first polarization direction 24. For example, a polarization filter that is provided with a polarization transmission axis so as to shield s-polarized light is used as the first polarization filter 12. The use of the polarization filter that shields s-polarized light as the first polarization filter 12 makes it possible to prevent a difference in appearance between a plurality of images obtained by light reflected from, for example, a water surface due to the reflected light.

Figure 3:
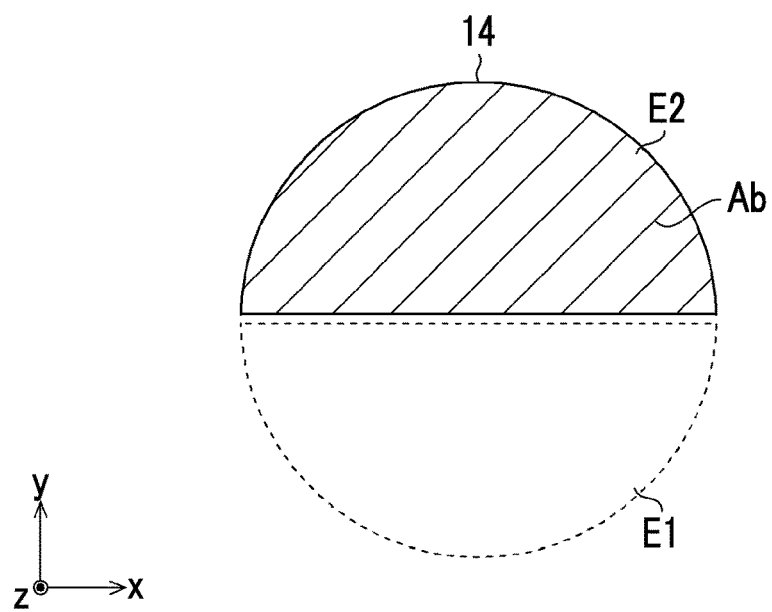
FIG. 3 is a front view illustrating a schematic configuration of a second polarization filter.

FIG. 3 is a front view illustrating a schematic configuration of the second polarization filter (second polarizer) 14. The second polarization filter 14 is provided behind the first polarization filter 12 (on the side close to the imaging element 100). Then, the second polarization filter 14 has a polarization transmission axis (Ab) that transmits the light transmitted through the first pupil region E1 or the second pupil region E2. In the case illustrated in FIG. 3, the second polarization filter 14 transmits the light in the second polarization direction 26 in the light transmitted through the second pupil region E2. Further, in the second polarization filter 14 illustrated in FIG. 3, a portion corresponding to the first pupil region E1 is blank and transmits the light in the first polarization direction 24.

Figure 4:
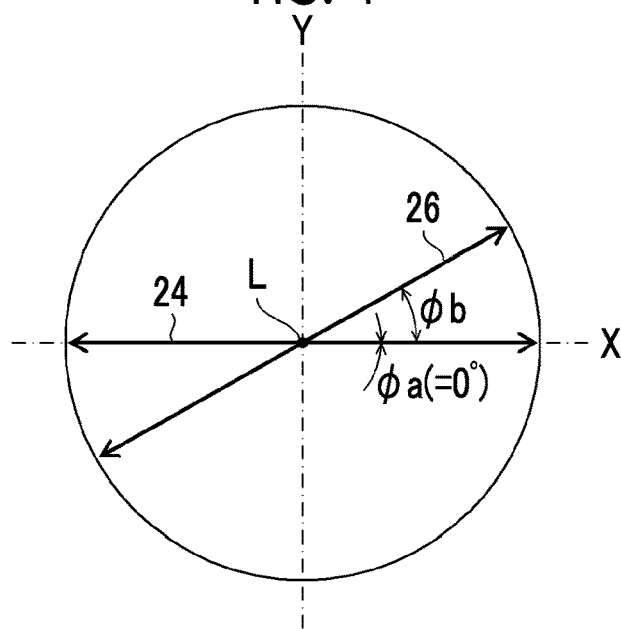
FIG. 4 is a diagram illustrating an example of a first polarization direction and a second polarization direction.

FIG. 4 is a diagram illustrating an example of the first polarization direction 24 and the second polarization direction 26.

The polarization direction is represented by an angle (Da (azimuth angle) formed between the polarization transmission axis (Aa) of the first polarization filter 12 and the X-axis and an angle Φb (azimuth angle) formed between the polarization transmission axis (Ab) of the second polarization filter 14 and the X-axis in the XY plane orthogonal to an optical axis L. As illustrated in FIG. 4, the first polarization filter 12 is configured to transmit light having an angle (Da of 0° (azimuth angle 0°) formed between the polarization transmission axis Aa and the X-axis. That is, in the case illustrated in FIG. 4, the first polarization direction 24 is 0°. The second polarization filter 14 is configured to transmit light having an angle Φb of 30° (azimuth angle 30°) formed between the polarization transmission axis Ab and the X-axis. That is, in the case illustrated in FIG. 4, the second polarization direction 26 is 30°. As a result, the light transmitted through the first pupil region E1 becomes light having the first polarization direction 24, and the light transmitted through the second pupil region E2 becomes light having the second polarization direction 26.

[Imaging Element]

Figure 5:
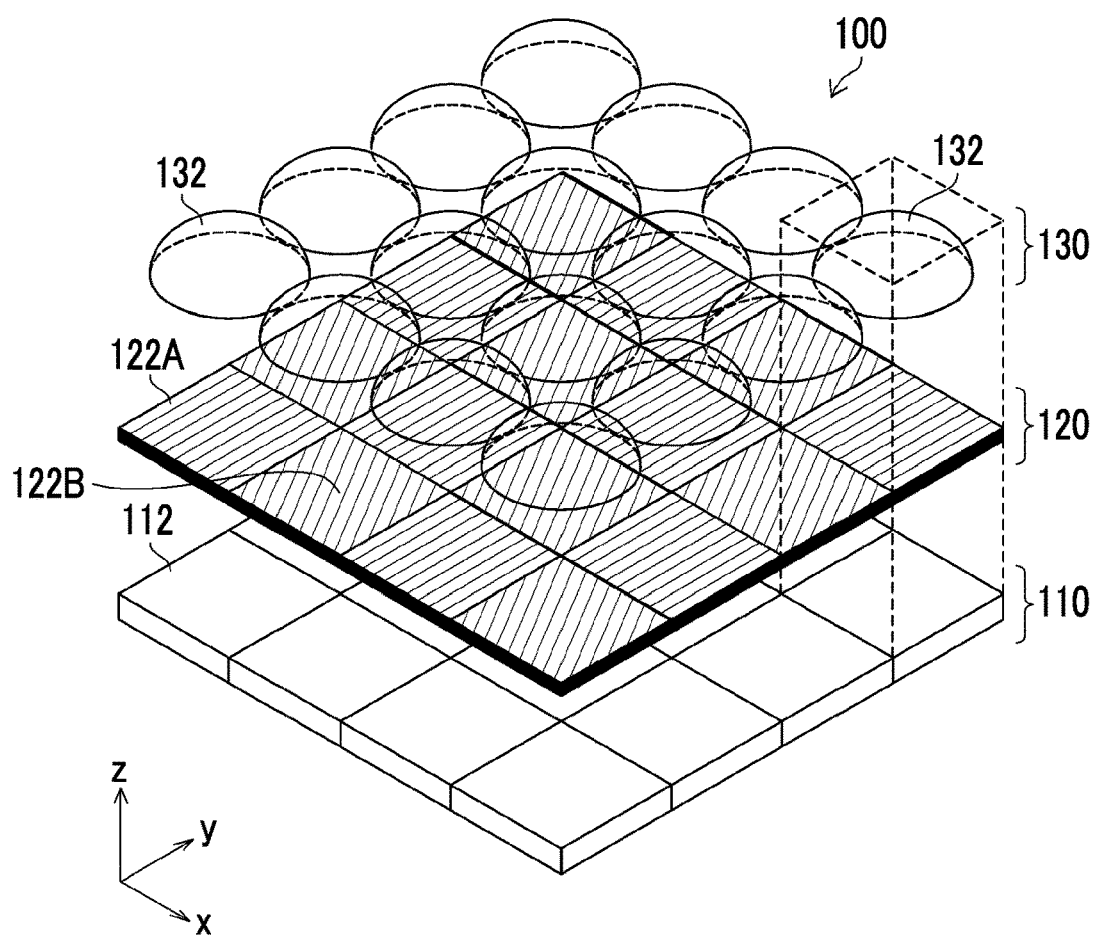
FIG. 5 is a diagram illustrating a schematic configuration of an imaging element.
Figure 6:
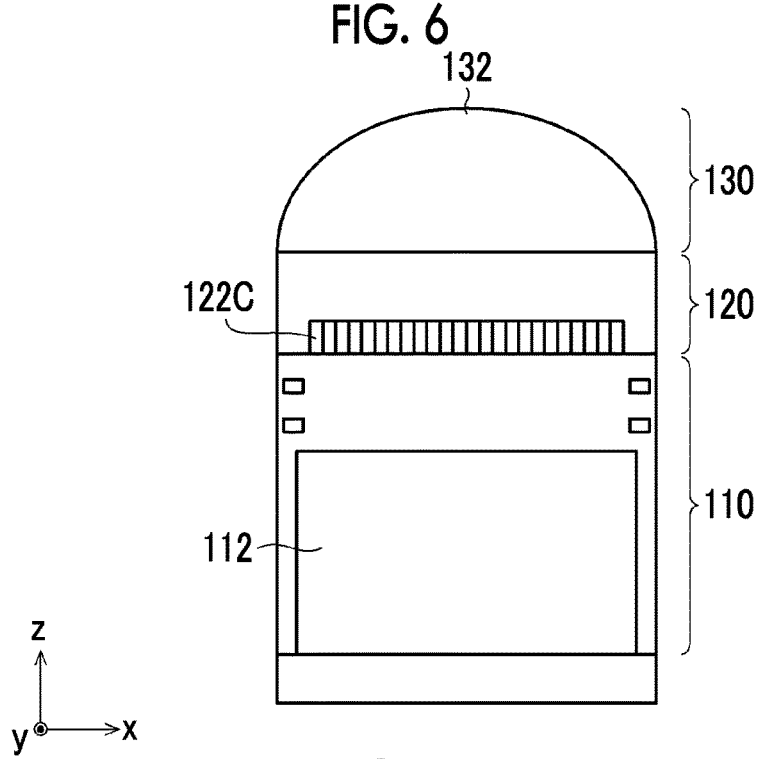
FIG. 6 is a cross-sectional view illustrating a schematic configuration of one pixel.

FIG. 5 is a diagram illustrating a schematic configuration of the imaging element 100 and is an exploded and enlarged view of a portion of the imaging element 100. FIG. 6 is a cross-sectional view illustrating a schematic configuration of one pixel (a portion represented by a dashed line in FIG. 5).

As illustrated in FIG. 5, the imaging element 100 has a pixel array layer 110, a polarization element array layer 120, and a microlens array layer 130.

The pixel array layer 110 is configured by two-dimensionally arranging a large number of photodiodes 112. One photodiode 112 constitutes one pixel. The photodiodes 112 are regularly arranged along the x-axis direction and the y-axis direction.

The polarization element array layer 120 is provided between the pixel array layer 110 and the microlens array layer 130. The polarization element array layer 120 is configured by two-dimensionally arranging two different types of polarization elements 122A and 122B. Each of the polarization elements 122A and 122B is disposed at the same interval as the photodiodes 112 and is comprised in each pixel. Therefore, one photodiode 112 comprises any one of two types of polarization elements 122A and 122B.

Figure 7:
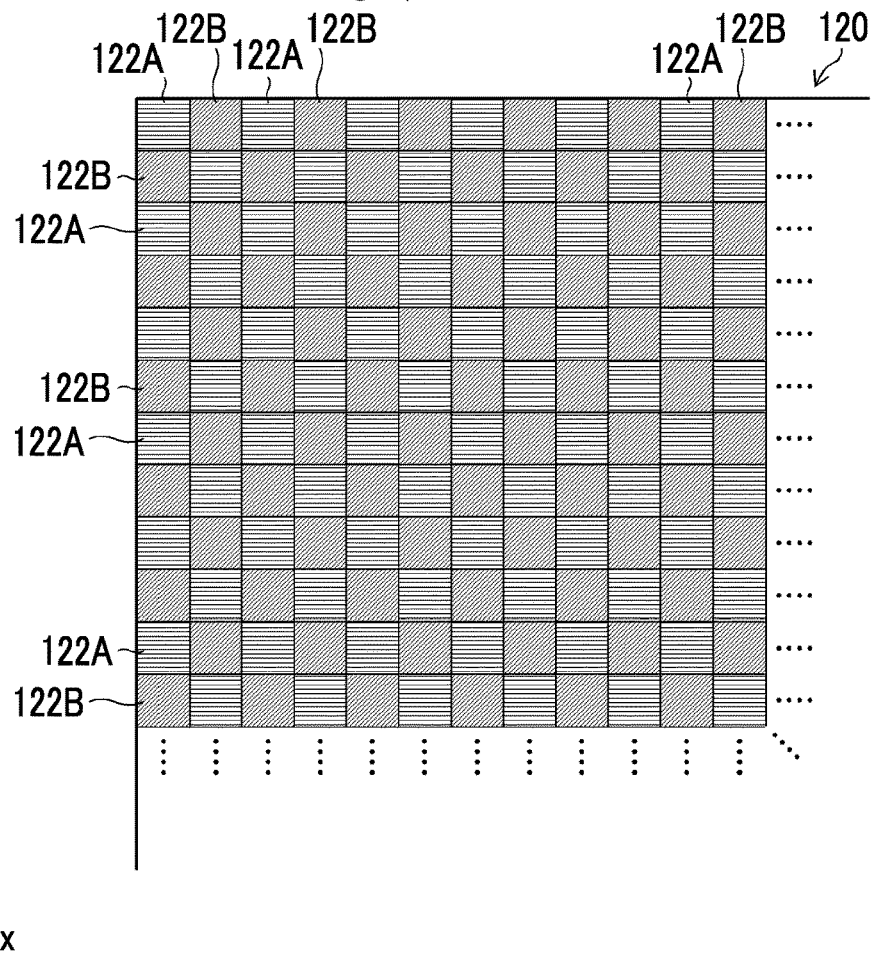
FIG. 7 is a diagram illustrating an example of the arrangement pattern of two types of polarization elements.

FIG. 7 is a diagram illustrating an example of the arrangement pattern of two types of polarization elements.

As illustrated in FIG. 7, the two types of polarization elements 122A and 122B are regularly arranged in a predetermined order along the x-axis direction and the y-axis direction.

In the example illustrated in FIG. 7, the first polarization elements 122A and the second polarization elements 122B are regularly arranged in a predetermined pattern by alternately arranging a row in which the first polarization element 122A and the second polarization element 122B are repeatedly arranged in this order and a row in which the second polarization element 122B and the first polarization element 122A are repeatedly arranged in this order. For the first polarization elements 122A and the second polarization elements 122B arranged in this way, a set of two types of polarization elements (one first polarization element 122A and one second polarization element 122B) constitutes one unit, and the units are regularly arranged along the x-axis direction and the y-axis direction.

Figure 8:
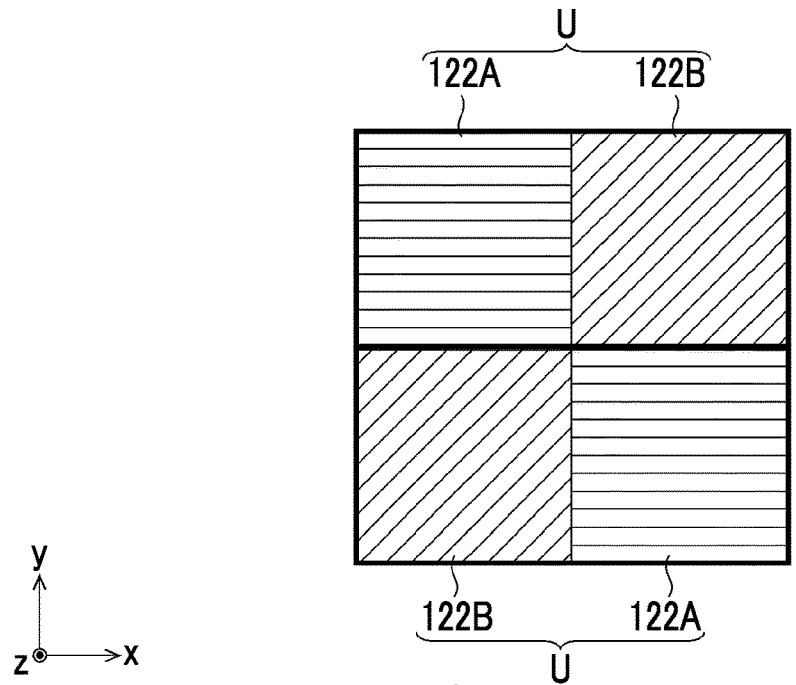
FIG. 8 is a diagram illustrating a configuration of one unit of the polarization elements.

FIG. 8 is a diagram illustrating the configuration of one unit of the polarization elements.

As illustrated in FIG. 8, one unit includes one first polarization element 122A and one second polarization element 122B.

As described above, the first polarization element 122A and the second polarization element 122B have different polarization directions. In this embodiment, the first polarization element 122A is configured to transmit light having an azimuth angle of +0°. The second polarization element 122B is configured to transmit light having an azimuth angle of +45°. Therefore, the photodiode 112 comprising the first polarization element 122A receives the light (linearly polarized light) having an azimuth angle of +0°. The photodiode 112 comprising the second polarization element 122B receives the light (linearly polarized light) having an azimuth angle of +45°.

The microlens array layer 130 is configured by two-dimensionally arranging a large number of microlenses 132. Each of the microlenses 132 is disposed at the same interval as the photodiodes 112 and is comprised in each pixel. The microlens 132 is comprised in order to efficiently focus light from the imaging optical system 10 on the photodiode 112.

Figure 9:
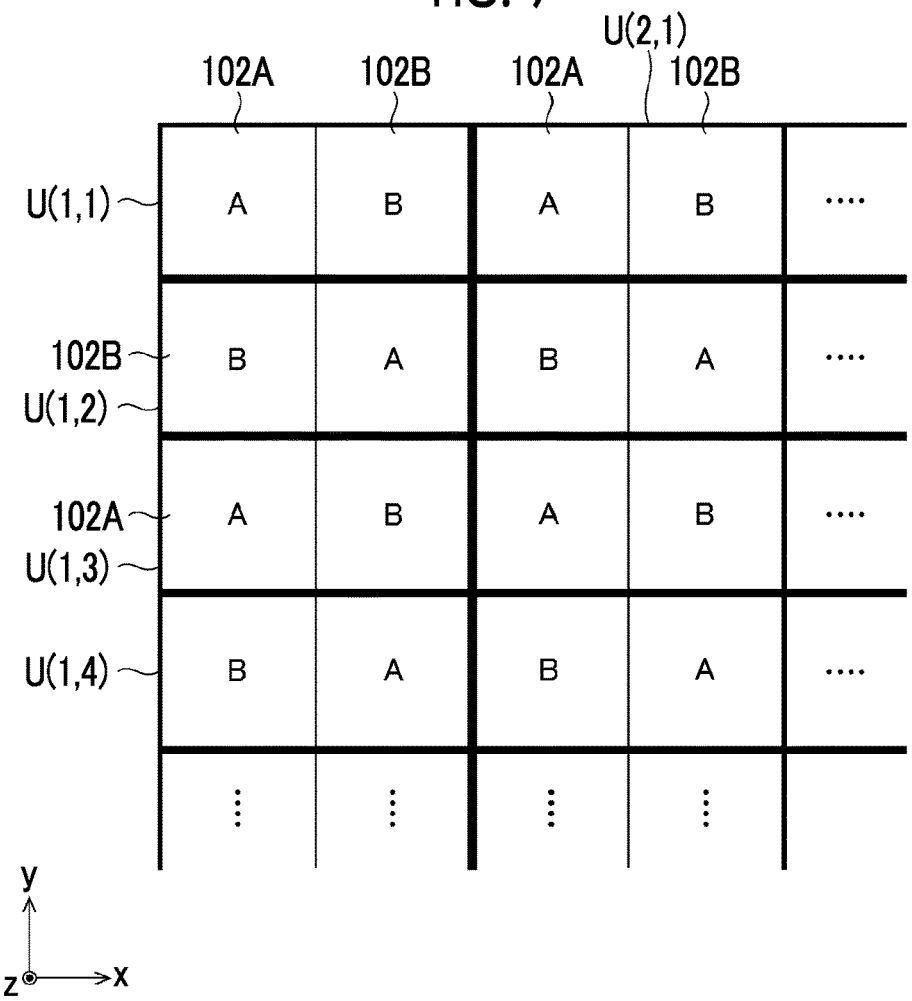
FIG. 9 is a diagram illustrating an example of the arrangement of pixels in the imaging element.

FIG. 9 is a diagram illustrating an example of the arrangement of the pixels in the imaging element 100.

Each pixel comprises the first polarization element 122A or the second polarization element 122B. It is assumed that the pixel (the image of A in FIG. 9) comprising the first polarization element 122A is a first pixel 102A and the pixel (the image of B in FIG. 9) comprising the second polarization element 122B is a second pixel 102B. The imaging element 100 has a plurality of units each of which is a set of two pixels including one first pixel 102A and one second pixel 102B. The unit which is a set of two pixels is referred to as a pixel unit U(x, y). As illustrated in FIG. 9, the pixel units U(x, y) are regularly arranged along the x-axis direction and the y-axis direction.

[Signal Processing Unit]

The signal processing unit 200 processes the signal output from the imaging element 100 to generate a first image corresponding to the light transmitted through the first pupil region E1 and a second image corresponding to the light transmitted through the second pupil region E2.

Figure 10:
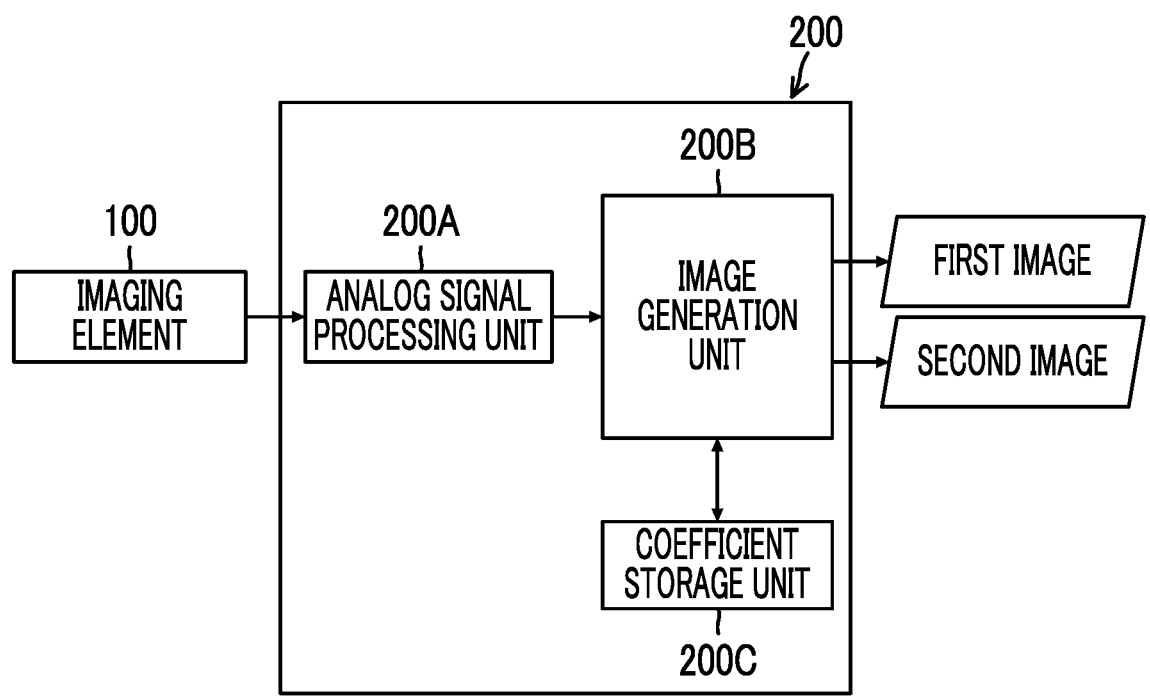
FIG. 10 is a block diagram illustrating a schematic configuration of a signal processing unit.

FIG. 10 is a block diagram illustrating a schematic configuration of the signal processing unit 200.

As illustrated in FIG. 10, the signal processing unit 200 includes an analog signal processing unit 200A, an image generation unit 200B, and a coefficient storage unit 200C.

The analog signal processing unit 200A acquires an analog pixel signal output from each pixel of the imaging element 100, performs predetermined signal processing (for example, a correlated double sampling process or an amplification process), converts the analog pixel signal into a digital signal, and outputs the digital signal.

The image generation unit 200B performs predetermined signal processing on the pixel signal converted into the digital signal to generate the images corresponding to the light transmitted through the first pupil region E1 and the light transmitted through the second pupil region E2.

FIG. 11 is a conceptual diagram illustrating image generation.

Each pixel unit U(x, y) includes one first pixel 102A and one second pixel 102B. Therefore, two images (the first image and the second image) are generated by separating and extracting the pixel signals of the first pixel 102A and the second pixel 102B from each pixel unit U(x, y). That is, the first image configured by extracting the pixel signal from the first pixel 102A of each pixel unit U(x, y) and the second image configured by extracting the pixel signal of the second pixel 102B of each pixel unit U(x, y) are generated.

However, as described above, the light received by the first pixel 102A includes light in the first polarization direction 24 (light transmitted through the first pupil region E1) and light in the second polarization direction 26 (light transmitted through the second pupil region E2). In addition, the light received by the second pixel 102B includes light in the first polarization direction 24 (light transmitted through the first pupil region E1) and light in the second polarization direction 26 (light transmitted through the second pupil region E2). That is, the light in the first polarization direction 24 and the light in the second polarization direction 26 are incident on the first pixel 102A and the second pixel 102B while being mixed with each other.

Therefore, the image generation unit 200B performs a process of removing crosstalk (crosstalk removal process) to generate the first image corresponding to the light transmitted through the first pupil region E1 and the second image corresponding to the light transmitted through the second pupil region E2. The crosstalk removal process is performed as follows.

Here, it is assumed that the pixel signal (signal value) obtained by the first pixel 102A is x1 and the pixel signal obtained by the second pixel 102B is x2. Two pixel signals x1 and x2 are obtained from each pixel unit U(x, y). The image generation unit 200B calculates pixel signals X1 and X2 corresponding to the first polarization direction 24 and the second polarization direction 26 from the two pixel signals x1 and x2 with the following Expression 1 using a matrix A to remove crosstalk.

$$A = \begin{pmatrix} a11 & a12 \\ a21 & a22 \end{pmatrix} \quad \text{(Expression 1)}$$

$$\begin{pmatrix} X1 \\ X2 \end{pmatrix} = \begin{pmatrix} a11 & a12 \\ a21 & a22 \end{pmatrix} * \begin{pmatrix} x1 \\ x2 \end{pmatrix}$$

Hereinafter, the reason why the pixel signals X1 and X2 of the images corresponding to the light in the first polarization direction 24 and the light in the second polarization direction 26 can be calculated by Expression 1, that is, the reason why crosstalk can be removed will be described.

The ratio (the amount of crosstalk (also referred to as a crosstalk ratio)) at which the light transmitted through the first pupil region E1 and the second pupil region E2 is received by the first pixel 102A and the second pixel 102B is uniquely determined from the relationship between the polarization direction (the first polarization direction 24 and the second polarization direction 26) and the polarization directions of the first polarization element 122A and the second polarization element 122B comprised in the first pixel 102A and the second pixel 102B.

Here, assuming that the ratio at which the light in the first polarization direction 24 is received by the first pixel 102A is b11 and the ratio at which the light in the second polarization direction 26 is received by the first pixel 102A is b12, the following relationship is established between x1 and X1 and X2.

$$b11*X1+b12*X2=x1 \quad \text{(Expression 2)}$$

Further, assuming that the ratio at which the light in the first polarization direction 24 is received by the second pixel 102B is b21 and the ratio at which the light in the second polarization direction 26 is received by the second pixel 102B is b22, the following relationship is established between x2 and X1 and X2.

$$b21*X1+b22*X2=x2 \quad \text{(Expression 3)}$$

For X1 and X2, the simultaneous equations of Expressions 2 and 3 can be solved to acquire the pixel signals of the original images, that is, the pixel signals X1 and X2 of the image of the light in the first polarization direction 24 and the image of the light in the second polarization direction 26.

Here, the above-mentioned simultaneous equations can be represented by the following Expression 4 using a matrix B.

$$B = \begin{pmatrix} b11 & b12 \\ b21 & b22 \end{pmatrix} \quad \text{(Expression 4)}$$

$$\begin{pmatrix} b11 & b12 \\ b21 & b22 \end{pmatrix} * \begin{pmatrix} X1 \\ X2 \end{pmatrix} = \begin{pmatrix} x1 \\ x2 \end{pmatrix}$$

X1 and X2 are calculated by multiplying both sides by an inverse matrix $B^{-1}$ of the matrix B.

$$\begin{pmatrix} b11 & b12 \\ b21 & b22 \end{pmatrix}^{-1} * \begin{pmatrix} b11 & b12 \\ b21 & b22 \end{pmatrix} * \begin{pmatrix} X1 \\ X2 \end{pmatrix} = \begin{pmatrix} b11 & b12 \\ b21 & b22 \end{pmatrix}^{-1} * \begin{pmatrix} x1 \\ x2 \end{pmatrix}$$

$$\begin{pmatrix} X1 \\ X2 \end{pmatrix} = \begin{pmatrix} b11 & b12 \\ b21 & b22 \end{pmatrix}^{-1} * \begin{pmatrix} x1 \\ x2 \end{pmatrix}$$

As described above, the pixel signal X1 of the image obtained by the light transmitted through the first pupil region E1 and the pixel signal X2 of the image obtained by the light transmitted through the second pupil region E2 are calculated from the pixel signals x1 and x2 of the first pixel 102A and the second pixel 102B on the basis of the amount of light in the first polarization direction 24 and the amount of light in the second polarization direction 26 received by the first pixel 102A and the second pixel 102B.

The matrix A in Expression 1 is the inverse matrix $B^{-1}$ of the matrix B ($A=B^{-1}$). Therefore, each element aij (i=1, 2; j=1, 2) of the matrix A can be acquired by calculating the inverse matrix $B^{-1}$ of the matrix B. Each element bij (i=1, 2; j=1, 2) of the matrix B is the amounts (the amount of crosstalk) of light in the first polarization direction 24 and light in the second polarization direction 26 received by the first pixel 102A and the second pixel 102B.

That is, in the first row, the element b11 is the amount (the amount of crosstalk) of light in the first polarization direction 24 received by the first pixel 102A and the element b12 is the amount of light in the second polarization direction 26 received by the first pixel 102A.

In addition, in the second row, the element b21 is the amount of light in the first polarization direction 24 received by the second pixel 102B and the element b22 is the amount of light in the second polarization direction 26 received by the second pixel 102B. The inverse matrix $B^{-1}$ of the matrix B exists. Therefore, the calculation of the inverse matrix $B^{-1}$ of the matrix B makes it possible to calculate each element of the matrix A.

The ratio (the amount of crosstalk) at which the light transmitted through the first pupil region E1 and the light transmitted through the second pupil region E2 are received by each of the pixels 102A and 102B is calculated by the square of the cosine (cos) of an angular difference between the polarization direction of the light transmitted through the first pupil region E1 and the light transmitted through the second pupil region E2 and the polarization direction of the light received by the first pixel 102A and the second pixel 102B. Therefore, for example, assuming that the polarization direction (azimuth angle) of the light (linearly polarized light) transmitted through the first pupil region E1 (or the second pupil region E2) is α and the polarization direction (azimuth angle) of the light received by an i-th pixel is β, the ratio is calculated by $\cos^2(|\alpha-\beta|)$.

Figure 12A:
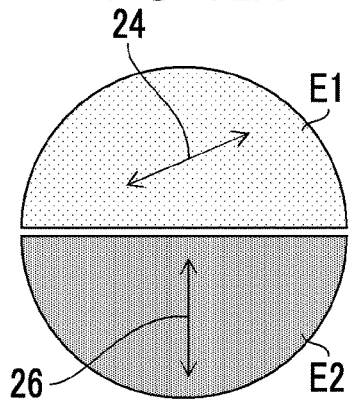
FIGS. 12A and 12B are diagrams illustrating an example of the calculation of a matrix A.
Figure 12B:
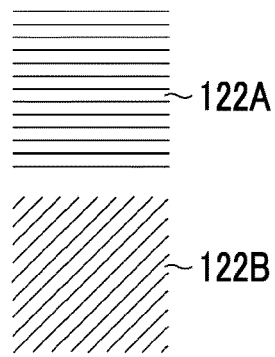
Figure 13A:
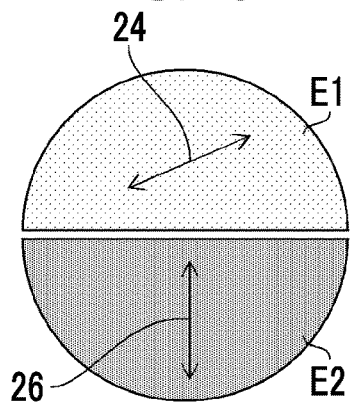
FIGS. 13A and 13B are diagrams illustrating an example of the calculation of the matrix A.
Figure 13B:
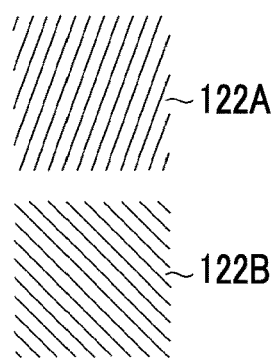

FIGS. 12A to 13B are diagrams illustrating examples of the calculation of the above-mentioned matrix A. In FIGS. 12A to 13B, the first polarization direction 24 of the light transmitted through the first pupil region E1 and the second polarization direction 26 of the light transmitted through the second pupil region E2 are illustrated (FIGS. 12A and 13A). Further, in FIGS. 12A to 13B, the polarization directions of the first polarization element 122A and the second polarization element 122B are illustrated (FIGS. 12B and 13B).

In the case illustrated in FIGS. 12A and 12B, the light transmitted through the first pupil region E1 is incident on the imaging element 100 as linearly polarized light having a polarization direction of 30°, and the light transmitted through the second pupil region E2 is incident on the imaging element 100 as linearly polarized light having a polarization direction of 90°. Further, the first polarization element 122A transmits light having a polarization direction of 0°, and the second polarization element 122B transmits light having a polarization direction of 45°.

Therefore, in this case, each element of the matrix B is as follows: b11=0.7500; b12=0.0000; b21=0.9330; and b22=0.5000.

$$B = \begin{pmatrix} 0.7500 & 0.0000 \\ 0.9330 & 0.5000 \end{pmatrix}$$

The inverse matrix $B^{-1}$ (matrix A) of the matrix B exists and has the following elements: a11=1.3333; a12=0; a21=−2.4880; and a22=2.0000.

$$B^{-1} = \begin{pmatrix} 1.3333 & 0 \\ -2.4880 & 2.0000 \end{pmatrix} = A$$

The coefficient storage unit 200C stores, as a coefficient group, each element of the matrix A of two rows and two columns calculated as the inverse matrix $B^{-1}$ of the matrix B. The coefficient storage unit 200C is an example of a storage unit.

In the case illustrated in FIGS. 13A and 13B, the light transmitted through the first pupil region E1 is incident on the imaging element 100 as linearly polarized light having a polarization direction of 30°, and the light transmitted through the second pupil region E2 is incident on the imaging element 100 as linearly polarized light having a polarization direction of 90°. Further, the first polarization element 122A transmits light having a polarization direction of 60°, and the second polarization element 122B transmits light having a polarization direction of 135°.

Therefore, in this case, each element of the matrix B is as follows: b11=0.7500; b12=0.7500; b21=0.0670; and b22=0.5000.

$$B = \begin{pmatrix} 0.7500 & 0.7500 \\ 0.0670 & 0.5000 \end{pmatrix}$$

The inverse matrix $B^{-1}$ (matrix A) of the matrix B exists and has the following elements: a11=1.5396; a12=−2.3094; a21=−0.2063; and a22=2.3094.

$$B^{-1} = \begin{pmatrix} 1.5396 & -2.3094 \\ -0.2063 & 2.3094 \end{pmatrix} = A$$

The coefficient storage unit 200C stores, as a coefficient group, each element of the matrix A of two rows and two columns calculated as the inverse matrix $B^{-1}$ of the matrix B. The coefficient storage unit 200C is an example of a storage unit.

Figure 14:
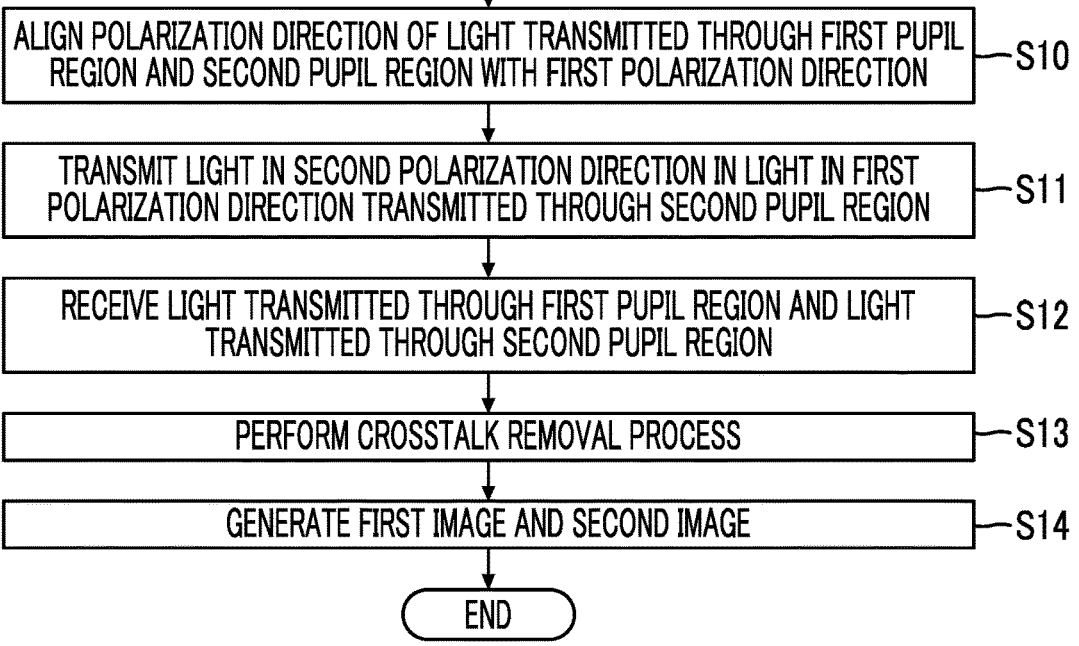
FIG. 14 is a flowchart illustrating the processing flow of an imaging method using the imaging device.

FIG. 14 is a flowchart illustrating the processing flow of an imaging method using the imaging device 1.

First, the first polarization filter 12 aligns the polarization direction of the light transmitted through the first pupil region E1 and the second pupil region E2 with the first polarization direction 24 (Step S10). Then, the second polarization filter 14 transmits the light in the second polarization direction 26 in the light transmitted through the second pupil region E2 (Step S11). Then, the first pixel 102A and the second pixel 102B receive the light transmitted through the first pupil region E1 and the light transmitted through the second pupil region E2 (Step S12). Then, the image generation unit 200B performs the crosstalk removal process on the pixel signals obtained from the first pixel 102A and the second pixel 102B (Step S13). Then, the image generation unit 200B generates the first image and the second image on the basis of the pixel signal of the first pixel 102A and the pixel signal of the second pixel 102B subjected to the crosstalk removal process (Step S14).

According to this embodiment described above, even in a case in which two different images are generated on the basis of light having two different types of polarization directions, it is possible to generate the images between which the difference in appearance caused by the difference between the polarization directions of the received light is suppressed since the first polarization filter 12 aligns the polarization of the pupil region E once.

Second Embodiment

Next, a second embodiment of the invention will be described. In this embodiment, a wavelength filter (bandpass filter) 40 is provided, and it is possible to independently obtain images of each wavelength band.

Figure 15:
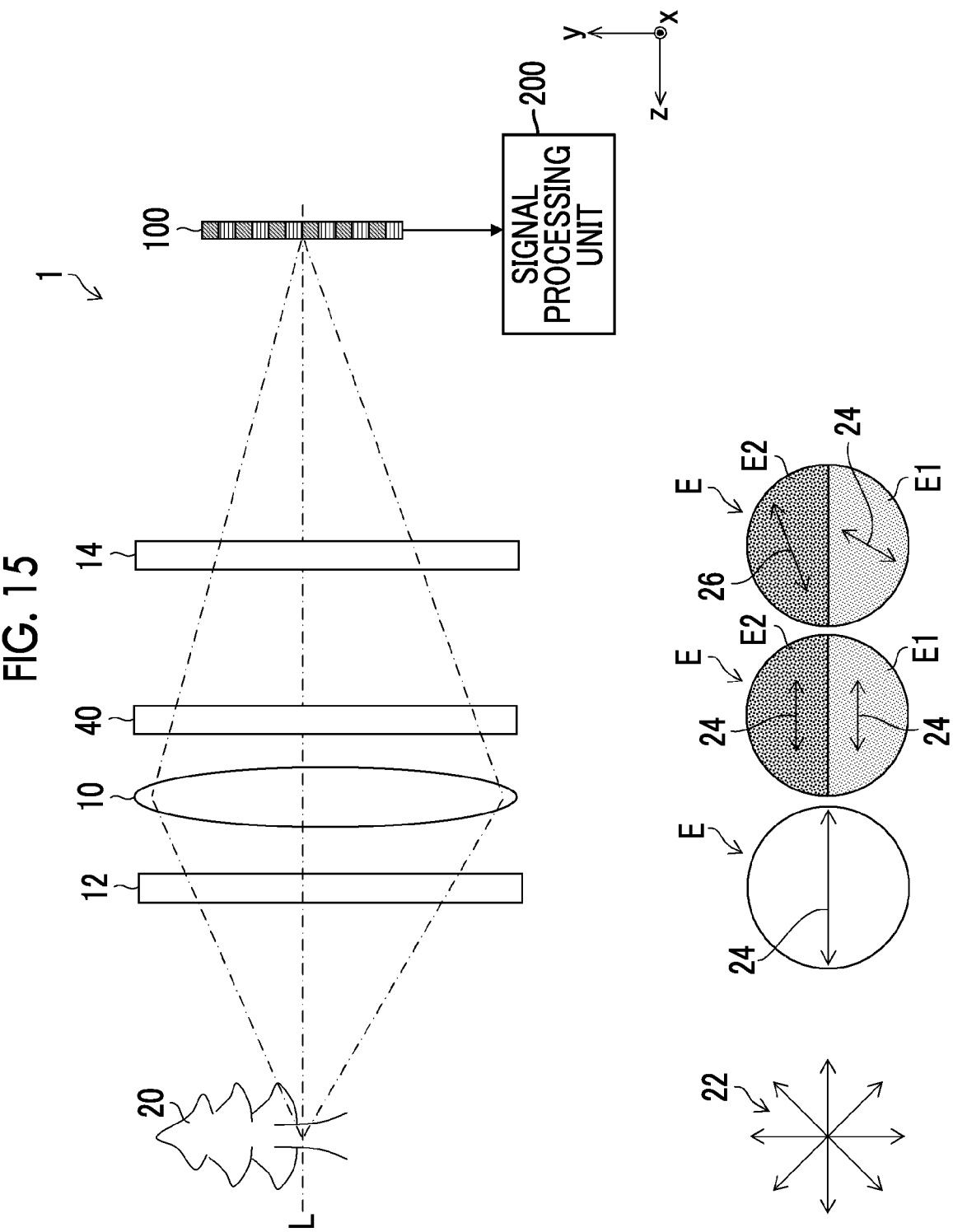
FIG. 15 is a diagram illustrating a schematic configuration of an imaging device.

FIG. 15 is a diagram illustrating a schematic configuration of an imaging device 1 according to this embodiment. In addition, the portions already described in FIG. 1 are denoted by the same reference numerals, and the description thereof will not be repeated.

As illustrated in FIG. 15, the imaging device 1 according to this embodiment comprises an imaging optical system 10, a first polarization filter 12, the wavelength filter 40, a second polarization filter 14, an imaging element 100, and a signal processing unit 200. Further, the position where the wavelength filter 40 is provided is not limited to between the first polarization filter 12 and the second polarization filter 14 as illustrated in FIG. 15 and is not particularly limited as long as light transmitted through the first pupil region E1 and light transmitted through the second pupil region E2 can be appropriately incident. Light transmitted through the wavelength filter 40 becomes light in different wavelength bands in the first pupil region E1 and the second pupil region E2 (illustrated below the wavelength filter 40).

Figure 16:
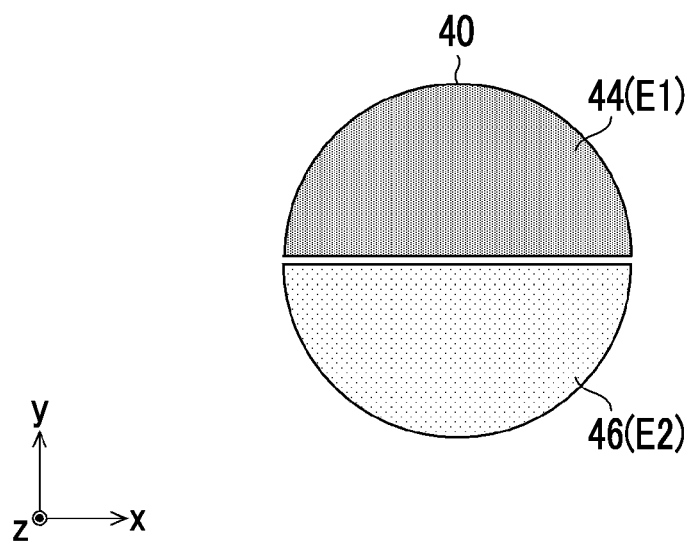
FIG. 16 is a front view illustrating a schematic configuration of a wavelength filter.

FIG. 16 is a front view illustrating a schematic configuration of the wavelength filter 40.

For example, the wavelength filter 40 transmits light in different wavelength bands in the first pupil region E1 and the second pupil region E2. Specifically, a region 44 corresponding to the first pupil region E1 and a region 46 corresponding to the second pupil region E2 transmit light in different wavelength bands. The wavelength filter 40 causes the first image corresponding to the light transmitted through the first pupil region E1 to become an image based on the light in the wavelength band (first wavelength band) transmitted through the region 44 and causes the second image corresponding to the light transmitted through the second pupil region E2 to become an image based on the light in the wavelength band (second wavelength band) transmitted through the region 46. In addition, FIG. 16 illustrates an example of the wavelength filter 40 in a case in which the pupil region E of the imaging optical system 10 is divided into the first pupil region E1 and the second pupil region E2. The wavelength filter 40 integrally comprises a first wavelength filter (first wavelength band) and a second wavelength filter (second wavelength band). In a case in which the pupil region E of the imaging optical system 10 is divided into a first pupil region E1, a second pupil region E2, and a third pupil region E3 (third embodiment) which will be described below, a wavelength filter 40 that transmits three different wavelength bands (a first wavelength band, a second wavelength band, and a third wavelength band) is used. Further, a wavelength filter 40 that integrally comprises a first wavelength filter, a second wavelength filter, and a third wavelength filter may be used. Alternatively, the first wavelength filter, the second wavelength filter, and the third wavelength filter may be provided separately. The images of a plurality of wavelength bands obtained in this way are appropriately applied to, for example, a fruit sugar content test, a food growth test, and a water quality test using spectral reflectance.

According to this embodiment described above, it is possible to independently generate the images of different wavelength bands. In addition, it is possible to generate the images between which the difference in appearance caused by the difference between the polarization directions of the received light is suppressed.

Third Embodiment

Next, a third embodiment of the invention will be described. In this embodiment, three different polarization directions (a first polarization direction 24, a second polarization direction 26, and a third polarization direction 28) are used to independently acquire three images.

Figure 17:
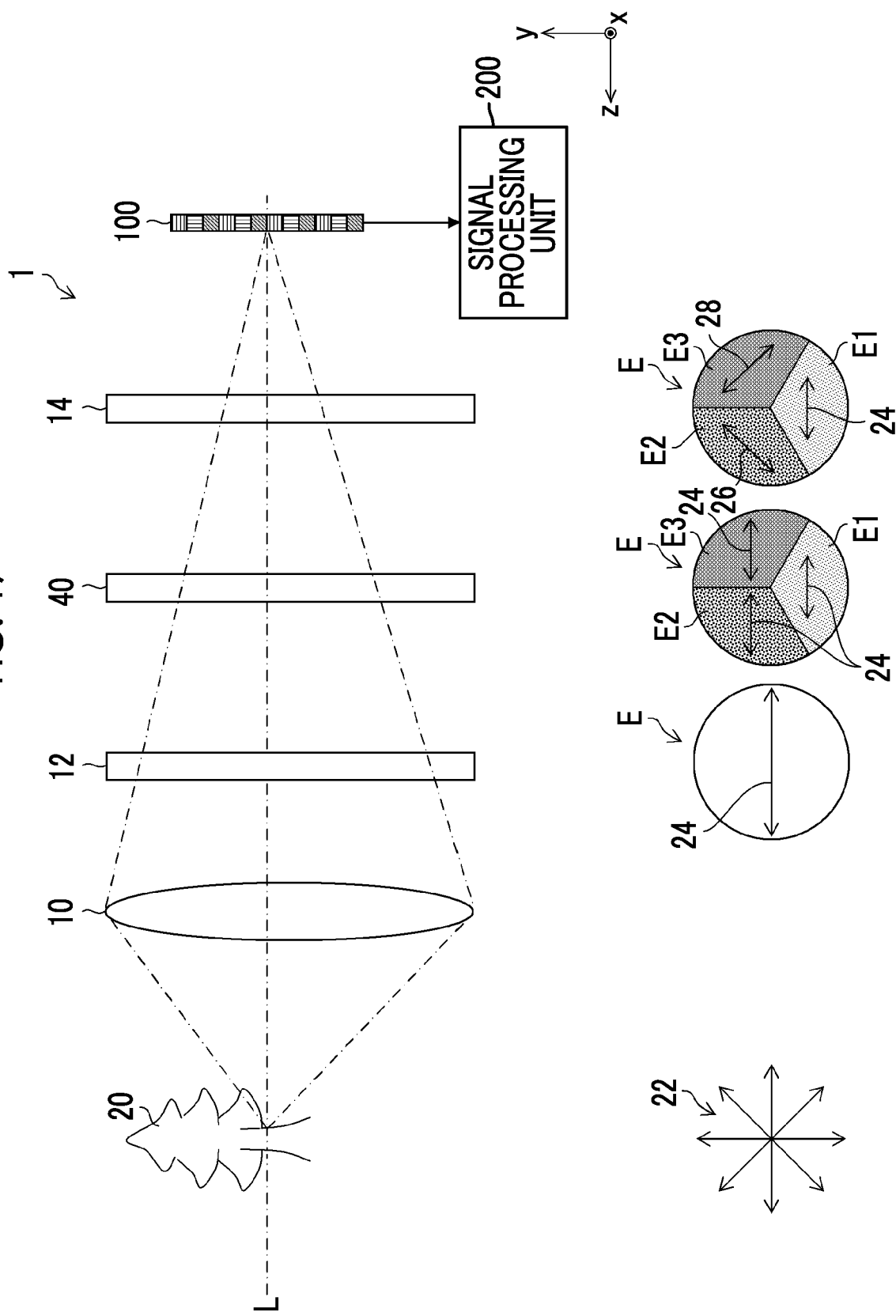
FIG. 17 is a diagram illustrating a schematic configuration of an imaging device.

FIG. 17 is a diagram illustrating a schematic configuration of an imaging device 1 according to the third embodiment. In addition, the portions already described in FIGS. 1 and 15 are denoted by the same reference numerals, and the description thereof will not be repeated.

As illustrated in FIG. 17, the imaging device 1 according to this embodiment comprises an imaging optical system 10, a first polarization filter 12, a wavelength filter 40, a second polarization filter 14, an imaging element 100, and a signal processing unit 200. In addition, FIG. 17 illustrates a polarization direction 22 of natural light reflected by an object 20, the first polarization direction 24 which is the polarization direction of light transmitted through the first polarization filter 12, the second polarization direction 26 which is the polarization direction of light transmitted through the second polarization filter 14, and the third polarization direction 28. Further, even in a case in which three images are independently acquired using three different polarization directions, a crosstalk removal process and image generation are similarly performed by applying the above-mentioned method in a case in which two images are acquired.

Figure 18:
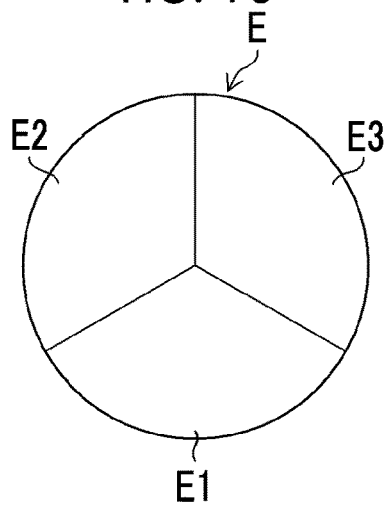
FIG. 18 is a front view illustrating a conceptual pupil region E of an imaging optical system.

FIG. 18 is a front view illustrating a conceptual pupil region E of the imaging optical system 10.

The pupil region E according to this embodiment includes a first pupil region E1, a second pupil region E2, and a third pupil region E3. For example, the first pupil region E1, the second pupil region E2, and the third pupil region E3 are regions obtained by equally dividing the pupil region E at an angle of 120°.

Figure 19:
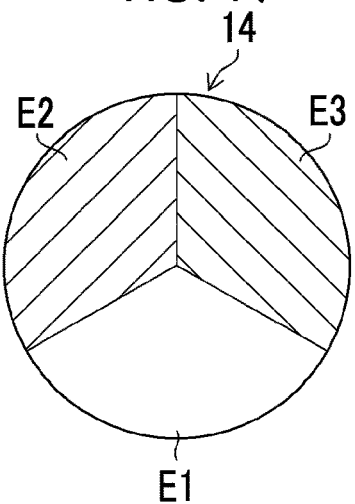
FIG. 19 is a front view illustrating a schematic configuration of a second polarization filter.

FIG. 19 is a front view illustrating a schematic configuration of the second polarization filter (comprising a second polarizer and a third polarizer) 14 according to this embodiment.

The second polarization filter 14 has different functions in the first pupil region E1, the second pupil region E2, and the third pupil region E3. In the second polarization filter 14, a region corresponding to the first pupil region E1 is transparent and transmits light in the first polarization direction 24. In the second polarization filter 14, a region corresponding to the second pupil region E2 has the function of the second polarizer, and a region corresponding to the third pupil region E3 has the function of the third polarizer. Then, the second polarizer provided in the second pupil region E2 transmits light in the second polarization direction 26 different from the first polarization direction 24 in the light which has been transmitted through the second pupil region E2 and has been aligned in the first polarization direction 24. In addition, the third polarizer provided in the third pupil region E3 transmits light in the third polarization direction 28 different from the first polarization direction 24 and the second polarization direction 26 in the light which has been transmitted through the third pupil region E3 and has been aligned in the first polarization direction 24. In the example illustrated in FIG. 19, one polarization filter has the functions of the second polarizer and the third polarizer. However, the invention is not limited thereto. A filter having the function of the second polarizer and a filter having the function of the third polarizer may be separately provided.

Figure 20A:
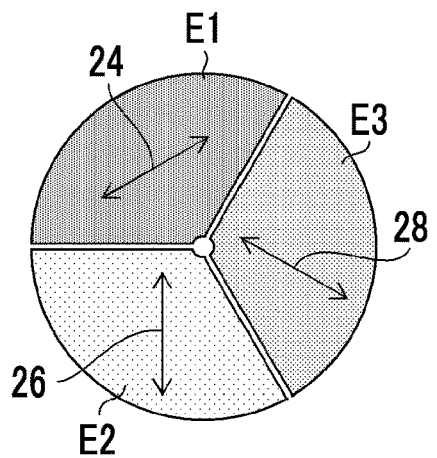
FIGS. 20A and 20B are diagrams illustrating an example of the calculation of the matrix A.
Figure 20B:
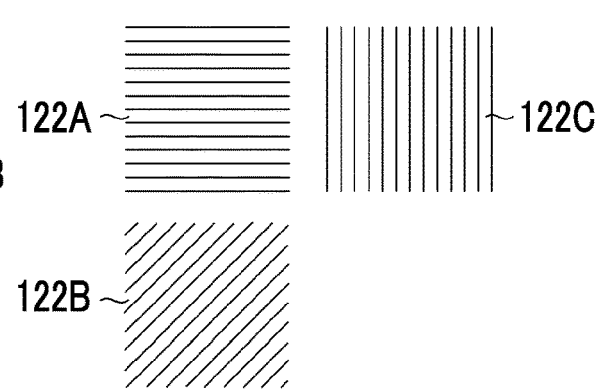
Figure 21A:
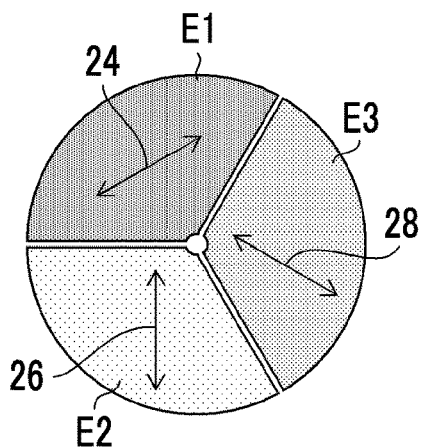
FIGS. 21A and 21B are diagrams illustrating an example of the calculation of the matrix A.
Figure 21B:
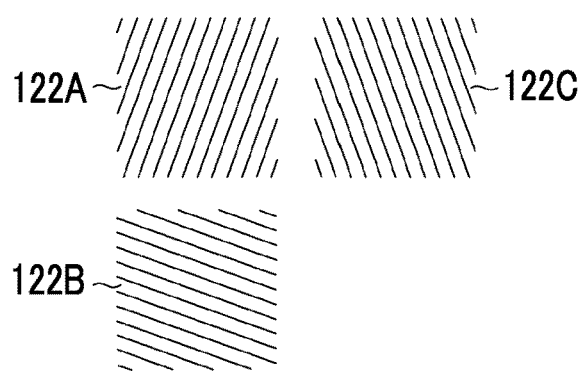

FIGS. 20A to 21B are diagrams illustrating examples of the calculation of the above-mentioned matrix A. In FIGS. 20A to 21B, the first polarization direction 24 of the light transmitted through the first pupil region E1, the second polarization direction 26 of the light transmitted through the second pupil region E2, and the third polarization direction 28 of the light transmitted through the third pupil region E3 are illustrated (FIGS. 20A and 21A). Further, in FIGS. 20A to 21B, the polarization directions of a first polarization element 122A, a second polarization element 122B, and a third polarization element 122C are illustrated (FIGS. 20B and 21B). In addition, the imaging element 100 according to this embodiment has a plurality of pixel units which receive the light transmitted through the first pupil region E1, the second pupil region E2, and the third pupil region E3 and each of which is a set of a first pixel, a second pixel, and a third pixel that receive light in different polarization directions.

In the case illustrated in FIGS. 20A and 20B, the light transmitted through the first pupil region E1 is incident on the imaging element 100 as linearly polarized light having a polarization direction of 30°, the light transmitted through the second pupil region E2 is incident on the imaging element 100 as linearly polarized light having a polarization direction of 90°, and the light transmitted through the third pupil region E3 is incident on the imaging element 100 as linearly polarized light having a polarization direction of 150°. Further, the first polarization element 122A transmits light having a polarization direction of 0°, the second polarization element 122B transmits light having a polarization direction of 45°, and the third polarization element 122C transmits light having a polarization direction of 90°.

Therefore, in this case, each element of the matrix B is as follows: b11=0.7500; b12=0.0000; b13=0.7500; b21=0.9330; b22=0.5000; b23=0.0670; b31=0.2500; b32=1.0000; and b33=0.2500.

$$B = \begin{pmatrix} 0.7500 & 0.0000 & 0.7500 \\ 0.9330 & 0.5000 & 0.0670 \\ 0.2500 & 1.0000 & 0.2500 \end{pmatrix}$$

The inverse matrix $B^{-1}$ (matrix A) of the matrix B exists, and each element thereof is as follows: a11=0.0893; a12=1.1547; a13=−0.5774; a21=−0.3333; a22=0.0000; a23=1.0000; a31=1.2440; a32=−1.1547; and a33=0.5774.

$$B^{-1} = \begin{pmatrix} 0.0893 & 1.1547 & -0.5774 \\ -0.3333 & 0.0000 & 1.0000 \\ 1.2440 & -1.1547 & 0.5774 \end{pmatrix} = A$$

In the case illustrated in FIGS. 21A and 21B, the light transmitted through the first pupil region E1 is incident on the imaging element 100 as linearly polarized light having a polarization direction of 30°, the light transmitted through the second pupil region E2 is incident on the imaging element 100 as linearly polarized light having a polarization direction of 90°, and the light transmitted through the third pupil region E3 is incident on the imaging element 100 as linearly polarized light having a polarization direction of 150°. Further, the first polarization element 122A transmits light having a polarization direction of 60°, the second polarization element 122B transmits light having a polarization direction of 150°, and the third polarization element 122C transmits light having a polarization direction of 105°.

Therefore, in this case, each element of the matrix B is as follows: b11=0.7500; b12=0.7500; b13=0.0000; b21=0.2500; b22=0.2500; b23=1.0000; b31=0.0670; b32=0.9330; and b33=0.5000.

$$B = \begin{pmatrix} 0.7500 & 0.7500 & 0.0000 \\ 0.2500 & 0.2500 & 1.0000 \\ 0.0670 & 0.9330 & 0.5000 \end{pmatrix}$$

The inverse matrix $B^{-1}$ (matrix A) of the matrix B exists, and each element thereof is as follows: a11=1.2440; a12=0.5774; a13=-1.1547; a21=0.0893; a22=-0.5774; a23=1.1547; a31=-0.3333; a32=1.0000; and a33=0.0000.

$$B^{-1} = \begin{pmatrix} 1.2440 & 0.5774 & -1.1547 \\ 0.0893 & -0.5774 & 1.1547 \\ -0.3333 & 1.0000 & 0.0000 \end{pmatrix} = A$$

Figure 22:
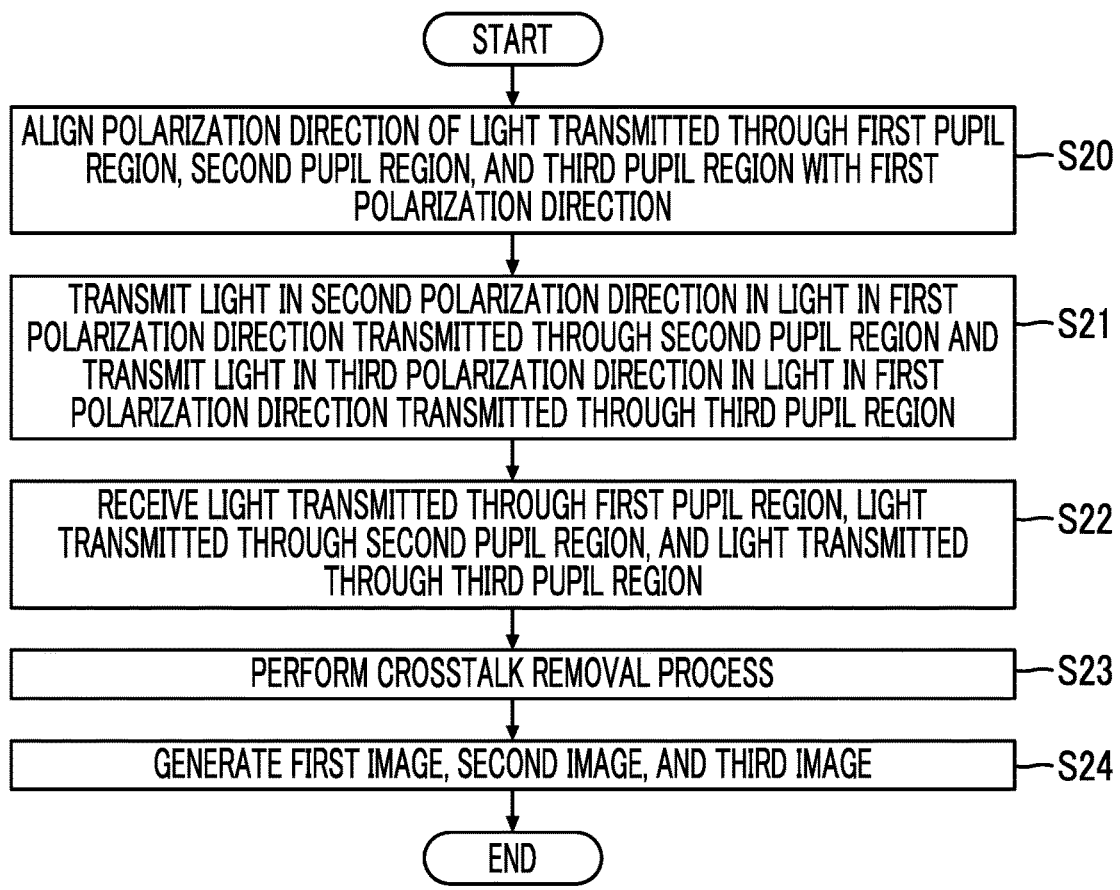
FIG. 22 is a flowchart illustrating the processing flow of an imaging method.

FIG. 22 is a flowchart illustrating the processing flow of an imaging method using the imaging device 1.

First, the first polarization filter 12 aligns the polarization direction of the light transmitted through the first pupil region E1, the second pupil region E2, and the third pupil region E3 with the first polarization direction 24 (Step S20). Then, the second polarization filter 14 transmits light in the second polarization direction 26 in the light transmitted through the second pupil region E2 and transmits light in the third polarization direction 28 in the light transmitted through the third pupil region E3 (Step S21). Then, the imaging element 100 receives the light transmitted through the first pupil region E1, the light transmitted through the second pupil region E2, and the light transmitted through the third pupil region E3 (Step S22). Then, the image generation unit 200B performs the crosstalk removal process (Step S23). Then, the image generation unit 200B generates the first image, the second image, and the third image (Step S24).

According to the above-described embodiment, even in a case in which three different images are generated on the basis of light having three different types of polarization directions, it is possible to generate the images between which the difference in appearance caused by the difference between the polarization directions of the received light is suppressed since the first polarization filter 12 aligns the polarization of the pupil region E once.

Fourth Embodiment

Next, a fourth embodiment of the invention will be described. In this embodiment, each polarizer transmits the light which has been transmitted through the first polarization filter 12 and then transmitted through the first pupil region E1 and the second pupil region E2, or the light which has been transmitted through the first polarization filter 12 and then transmitted through the first pupil region E1, the second pupil region E2, and the third pupil region E3.

Figure 23:
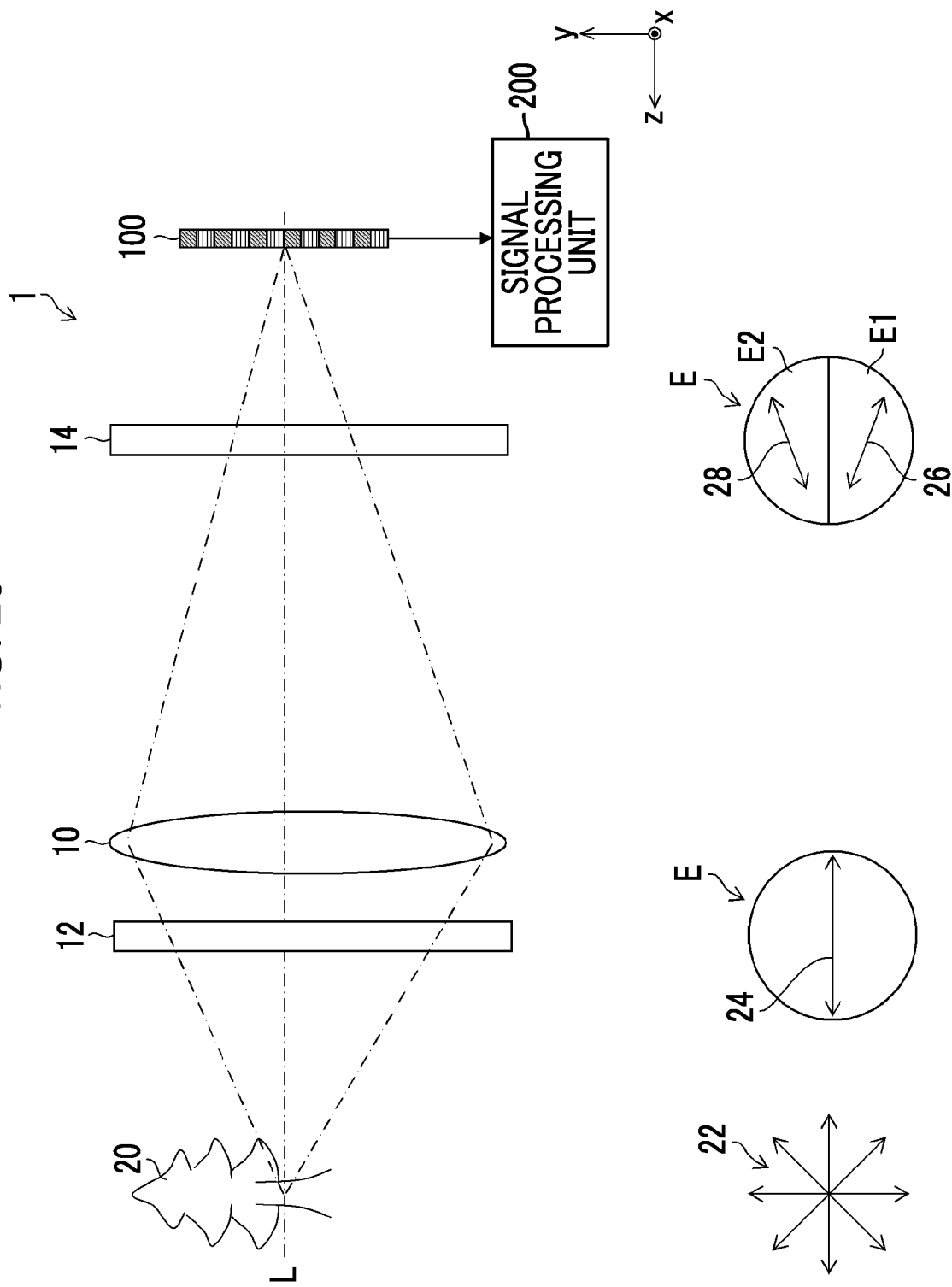
FIG. 23 is a diagram illustrating a schematic configuration according to another example of the imaging device.

FIG. 23 is a diagram illustrating a schematic configuration of another example of an imaging device 1 according to this embodiment. In addition, the portions already described in FIG. 1 are denoted by the same reference numerals, and the description thereof will not be repeated.

A second polarization filter 14 does not have a blank portion and has the functions of the second polarizer and the third polarizer. The second polarizer of the second polarization filter 14 transmits light having the second polarization direction 26 in the light having the first polarization direction 24 which has been transmitted through the first pupil region E1. In addition, the third polarizer of the second polarization filter 14 transmits light having the third polarization direction 28 in the light having the first polarization direction 24 which has been transmitted through the second pupil region E2. That is, the second polarization filter 14 according to this example does not have a blank portion and polarizes each of the light transmitted through the first pupil region E1 and the light transmitted through the second pupil region E2. Further, the second polarizer and the third polarizer may be comprised in a single polarization filter or may be comprised in separate polarization filters.

As such, since the second polarization filter 14 has the functions of the second polarizer and the third polarizer, the second polarization direction 26 and the third polarization direction can be orthogonal to each other as described below.

Figure 24A:
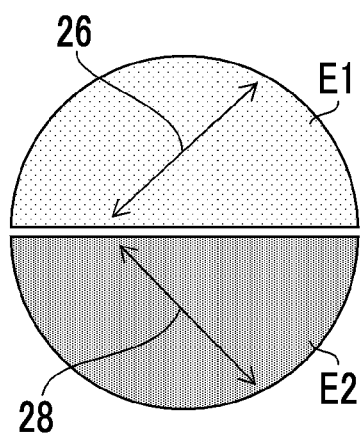
FIGS. 24A and 24B are diagrams illustrating an example of the calculation of the matrix A.
Figure 24B:
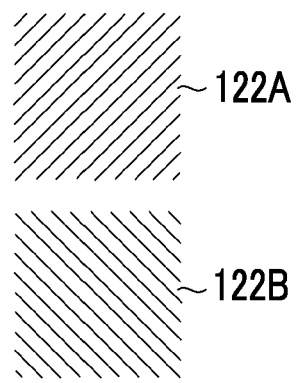

FIGS. 24A and 24B are diagrams illustrating an example of the calculation of the above-mentioned matrix A in a case in which the second polarization direction 26 and the third polarization direction are orthogonal to each other. In addition, the portions already described in FIGS. 20A to 21B are denoted by the same reference numerals, and the description thereof will not be repeated. In the case illustrated in FIGS. 24A and 24B, the light transmitted through the first pupil region E1 is incident on the imaging element 100 as linearly polarized light having a polarization direction of 45°, and the light transmitted through the second pupil region E2 is incident on the imaging element 100 as linearly polarized light having a polarization direction of 135°. Further, a first polarization element 122A transmits light having a polarization direction of 45°, and a second polarization element 122B transmits light having a polarization direction of 135°. In the case illustrated in FIGS. 24A and 24B, the polarization direction (second polarization direction 26) of the light transmitted through the first pupil region E1 and the polarization direction (third polarization direction 28) of the light transmitted through the second pupil region E2 may be orthogonal to each other. In addition, the polarization direction (second polarization direction 26) of the light transmitted through the first pupil region E1 is the same as the polarization direction of the first polarization element 122A. The polarization direction (third polarization direction 28) of the light transmitted through the second pupil region E2 is the same as the polarization direction of the second polarization element 122B.

Therefore, in this case, each element of the matrix B is as follows: b11=1.0000; b12=0.0000; b21=0.0000; and b22=1.0000.

$$B = \begin{pmatrix} 1.0000 & 0.0000 \\ 0.0000 & 1.0000 \end{pmatrix}$$

That is, in this case, crosstalk may not occur ideally. As such, in a case in which crosstalk does not occur, it is possible to generate each image from the signals obtained from the first pixel 102A and the second pixel 102B, without performing the crosstalk removal process. That is, the pixel signal X1 of the first pupil region E1 is the pixel signal x1 of the first pixel 102A, and the pixel signal X2 of the second pupil region E2 is the pixel signal x2 of the first pixel 102A.

Figure 25:
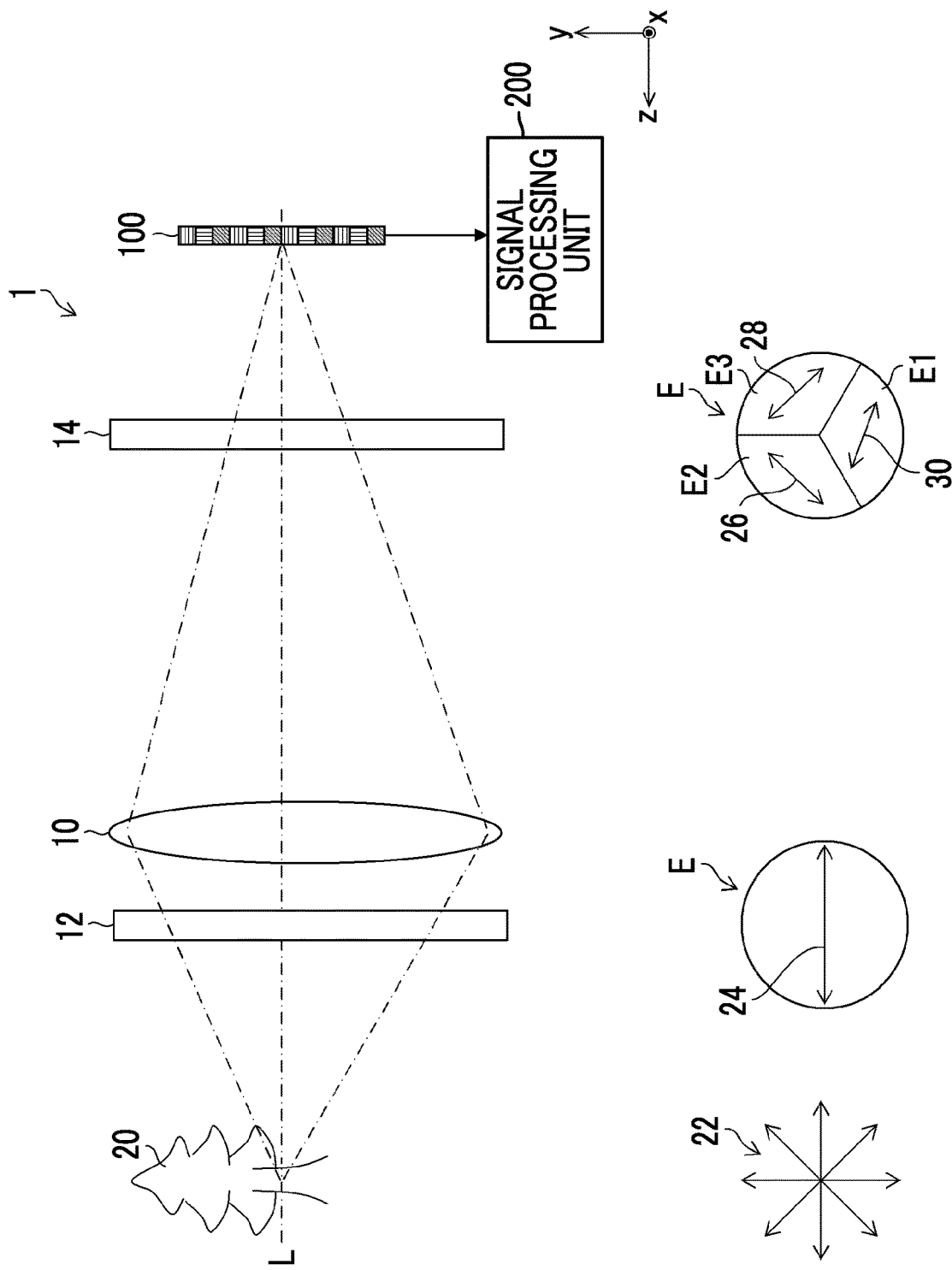
FIG. 25 is a diagram illustrating a schematic configuration of another example of the imaging device.

FIG. 25 is a diagram illustrating a schematic configuration of another example of the imaging device 1 according to this embodiment. In addition, the portions already described in FIG. 17 are denoted by the same reference numerals, and the description thereof will not be repeated.

The second polarization filter 14 does not have a blank portion and has the functions of a second polarizer, a third polarizer, and a fourth polarizer. The second polarizer of the second polarization filter 14 transmits light having the second polarization direction 26 in the light having the first polarization direction 24 which has been transmitted through the first pupil region E1. In addition, the third polarizer of the second polarization filter 14 transmits light having the third polarization direction 28 in the light having the first polarization direction 24 which has been transmitted through the second pupil region E2. Further, the fourth polarizer of the second polarization filter 14 transmits light having the fourth polarization direction 30 among the light having the first polarization direction 24 which has been transmitted through the third pupil region E3. That is, the second polarization filter 14 according to this example does not have a blank portion and polarizes each of the light transmitted through the first pupil region E1, the light transmitted through the second pupil region E2, and the light transmitted through the third pupil region E3. In addition, the second polarizer, the third polarizer, and the fourth polarizer may be provided in a single polarization filter or may be provided in separate polarization filters.

According to this embodiment described above, it is possible to generate images on the basis of light in various polarization directions without being limited to the polarization direction aligned by the first polarization filter 12. In addition, it is possible to generate the images between which the difference in appearance caused by the difference between the polarization directions of the received light is suppressed.

The examples of the invention have been described above. However, the invention is not limited to the above-described embodiments, and various modifications can be made without departing from the spirit of the invention.

EXPLANATION OF REFERENCES

1: imaging device
10: imaging optical system
12: first polarization filter
14: second polarization filter
20: object
40: wavelength filter
100: imaging element
102A: first pixel
102B: second pixel
110: pixel array layer
112: photodiode
120: polarization element array layer
122A: first polarization element
122B: second polarization element
122C: third polarization element
130: microlens array layer
132: microlens
200: signal processing unit
200A: analog signal processing unit
200B: image generation unit
200C: coefficient storage unit
E1: first pupil region
E2: second pupil region
E3: third pupil region
L: optical axis

What is claimed is:

1. An imaging device comprising:
an imaging optical system that has a pupil region including a first pupil region and a second pupil region different from the first pupil region;
a first polarizer that aligns a polarization direction of light transmitted through the first pupil region and the second pupil region with a first polarization direction;
a second polarizer that transmits light in a second polarization direction different from the first polarization direction in the light which has been transmitted through the second pupil region and has been aligned in the first polarization direction;
an imaging element that receives the light transmitted through the first pupil region and the second pupil region and has a plurality of pixel units each of which is a set of a first pixel and a second pixel receiving light in different polarization directions; and
an image generation unit that performs a crosstalk removal process on pixel signals of the first pixel and the second pixel and generates a first image corresponding to the light transmitted through the first pupil region and a second image corresponding to the light transmitted through the second pupil region on the basis of the pixel signals subjected to the crosstalk removal process.

2. The imaging device according to claim 1, further comprising:
a third polarizer that transmits light in a third polarization direction different from the first polarization direction and the second polarization direction in the light which has been transmitted through the first pupil region and has been aligned in the first polarization direction.

3. The imaging device according to claim 1, further comprising:
a first wavelength filter that transmits light in a first wavelength band in the light transmitted through the first pupil region; and
a second wavelength filter that transmits light in a second wavelength band in the light transmitted through the second pupil region.

4. The imaging device according to claim 1, wherein the first polarizer shields s-polarized light.

5. The imaging device according to claim 1, wherein, in the imaging element, the pixel unit includes a pixel including a polarization element.

6. The imaging device according to claim 5, wherein, in the imaging element, the polarization element is provided between a photodiode and a microlens which constitute the pixel.

7. An imaging device comprising:
an imaging optical system that has a pupil region including a first pupil region and a second pupil region different from the first pupil region;
a first polarizer that aligns a polarization direction of light transmitted through the first pupil region and the second pupil region with a first polarization direction;
a second polarizer that transmits light in a second polarization direction different from the first polarization direction in the light which has been transmitted through the second pupil region and has been aligned in the first polarization direction;
a third polarizer that transmits light in a third polarization direction, which is different from the first polarization direction and is orthogonal to the second polarization direction, in the light which has been transmitted through the first pupil region and has been aligned in the first polarization direction;
an imaging element that receives the light transmitted through the first pupil region and the second pupil region and has a plurality of pixel units each of which is a set of a first pixel receiving the light in the second polarization direction and a second pixel receiving the light in the third polarization direction; and
an image generation unit that generates a first image corresponding to the light transmitted through the first pupil region and a second image corresponding to the light transmitted through the second pupil region on the basis of pixel signals of the first pixel and the second pixel.

8. The imaging device according to claim 7, further comprising:
a first wavelength filter that transmits light in a first wavelength band in the light transmitted through the first pupil region; and
a second wavelength filter that transmits light in a second wavelength band in the light transmitted through the second pupil region.

9. The imaging device according to claim 7, wherein, in the imaging element, the pixel unit includes a pixel including a polarization element.

10. An imaging device comprising:
an imaging optical system that has a pupil region including a first pupil region, a second pupil region different from the first pupil region, and a third pupil region different from the first pupil region and the second pupil region;
a first polarizer that aligns a polarization direction of light transmitted through the first pupil region, the second pupil region, and the third pupil region with a first polarization direction;
a second polarizer that transmits light in a second polarization direction different from the first polarization direction in the light which has been transmitted through the second pupil region and has been aligned in the first polarization direction;
a third polarizer that transmits light in a third polarization direction different from the first polarization direction and the second polarization direction in the light which has been transmitted through the third pupil region and has been aligned in the first polarization direction;
an imaging element that receives the light transmitted through the first pupil region, the second pupil region, and the third pupil region and has a plurality of pixel units each of which is a set of a first pixel, a second pixel, and a third pixel receiving light in different polarization directions; and
an image generation unit that performs a crosstalk removal process on pixel signals of the first pixel, the second pixel, and the third pixel and generates a first image corresponding to the light transmitted through the first pupil region, a second image corresponding to the light transmitted through the second pupil region, and a third image corresponding to the light transmitted through the third pupil region on the basis of the pixel signals subjected to the crosstalk removal process.

11. The imaging device according to claim 10, further comprising:
a fourth polarizer that transmits light in a fourth polarization direction different from the first polarization direction, the second polarization direction, and the third polarization direction in the light which has been transmitted through the first pupil region and has been aligned in the first polarization direction.

12. The imaging device according to claim 10, further comprising:
a first wavelength filter that transmits light in a first wavelength band in the light transmitted through the first pupil region;
a second wavelength filter that transmits light in a second wavelength band in the light transmitted through the second pupil region; and
a third wavelength filter that transmits light in a third wavelength band in the light transmitted through the third pupil region.

13. The imaging device according to claim 10, wherein, in the imaging element, the pixel unit includes a pixel including a polarization element.

14. An imaging method comprising:
a step of causing a first polarizer to align a polarization direction of light transmitted through a first pupil region and a second pupil region of an imaging optical system, which has a pupil region including the first pupil region and the second pupil region different from the first pupil region, with a first polarization direction;
a step of causing a second polarizer to transmit light in a second polarization direction different from the first polarization direction in the light which has been transmitted through the second pupil region and has been aligned in the first polarization direction; and
a step of performing a crosstalk removal process on pixel signals of a first pixel and a second pixel of an imaging element, which receives the light transmitted through the first pupil region and the second pupil region and has a plurality of pixel units each of which is a set of the first pixel and the second pixel receiving light in different polarization directions, and generating a first image corresponding to the light transmitted through the first pupil region and a second image corresponding to the light transmitted through the second pupil region on the basis of the pixel signals subjected to the crosstalk removal process.

15. An imaging method comprising:
a step of causing a first polarizer to align a polarization direction of light transmitted through a first pupil region and a second pupil region of an imaging optical system, which has a pupil region including the first pupil region and the second pupil region different from the first pupil region, with a first polarization direction;
a step of causing a second polarizer to transmit light in a second polarization direction different from the first polarization direction in the light which has been transmitted through the second pupil region and has been aligned in the first polarization direction;
a step of causing a third polarizer to transmit light in a third polarization direction, which is different from the first polarization direction and is orthogonal to the second polarization direction, in the light which has been transmitted through the first pupil region and has been aligned in the first polarization direction; and
a step of generating a first image corresponding to the light transmitted through the first pupil region and a second image corresponding to the light transmitted through the second pupil region on the basis of pixel signals of a first pixel and a second pixel of an imaging element which receives the light transmitted through the first pupil region and the second pupil region and has a plurality of pixel units each of which is a set of the first pixel receiving the light in the second polarization direction and the second pixel receiving the light in the third polarization direction.

16. An imaging method comprising:

a step of causing a first polarizer to align a polarization direction of light transmitted through a first pupil region, a second pupil region, and a third pupil region of an imaging optical system, which has a pupil region including the first pupil region, the second pupil region different from the first pupil region, and the third pupil region different from the first pupil region and the second pupil region, with a first polarization direction;

a step of causing a second polarizer to transmit light in a second polarization direction different from the first polarization direction in the light which has been transmitted through the second pupil region and has been aligned in the first polarization direction;

a step of causing a third polarizer to transmit light in a third polarization direction different from the first polarization direction and the second polarization direction in the light which has been transmitted through the third pupil region and has been aligned in the first polarization direction; and a step of performing a crosstalk removal process on pixel signals of a first pixel, a second pixel, and a third pixel of an imaging element, which receives the light transmitted through the first pupil region, the second pupil region, and the third pupil region and has a plurality of pixel units each of which is a set of the first pixel, the second pixel, and the third pixel receiving light in different polarization directions, and generating a first image corresponding to the light transmitted through the first pupil region, a second image corresponding to the light transmitted through the second pupil region, and a third image corresponding to the light transmitted through the third pupil region on the basis of the pixel signals subjected to the crosstalk removal process.

* * * * *